(12) United States Patent
Kawakami

(10) Patent No.: US 11,739,184 B2
(45) Date of Patent: Aug. 29, 2023

(54) POLYSILOXAZANE COMPOUND HAVING ALKOXYSILYL GROUP, PROCESS FOR PRODUCING SAME, AND COMPOSITION AND CURED PRODUCT INCLUDING SAME

(71) Applicant: Shin-Etsu Chemical Co., Ltd., Tokyo (JP)

(72) Inventor: Masato Kawakami, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 290 days.

(21) Appl. No.: 17/029,959

(22) Filed: Sep. 23, 2020

(65) Prior Publication Data

US 2021/0095079 A1 Apr. 1, 2021

(30) Foreign Application Priority Data

Sep. 27, 2019 (JP) .................................. 2019-177517

(51) Int. Cl.
*C08G 77/62* (2006.01)
*C08K 5/06* (2006.01)
(Continued)

(52) U.S. Cl.
CPC .............. *C08G 77/62* (2013.01); *C08K 5/06* (2013.01); *C08L 83/14* (2013.01); *C09D 183/14* (2013.01)

(58) Field of Classification Search
CPC ...... C08K 5/06; C08K 5/5425; C08K 5/5406; C08L 83/14; C09D 183/14; C08G 77/385; C08G 77/24; C08G 77/16; C08G 77/54

See application file for complete search history.

(56) References Cited

U.S. PATENT DOCUMENTS

2018/0312641 A1 11/2018 Grottenmüller et al.
2020/0255599 A1* 8/2020 Grottenmueller ...... C08G 77/12

FOREIGN PATENT DOCUMENTS

JP 2018-534400 A 11/2018
JP 2019-505645 A 2/2019

* cited by examiner

*Primary Examiner* — Robert S Jones, Jr.
*Assistant Examiner* — Jiangtian Xu
(74) *Attorney, Agent, or Firm* — Birch, Stewart, Kolasch & Birch, LLP

(57) ABSTRACT

A polysiloxazane compound having an alkoxysilyl group having an average composition of formula (1):

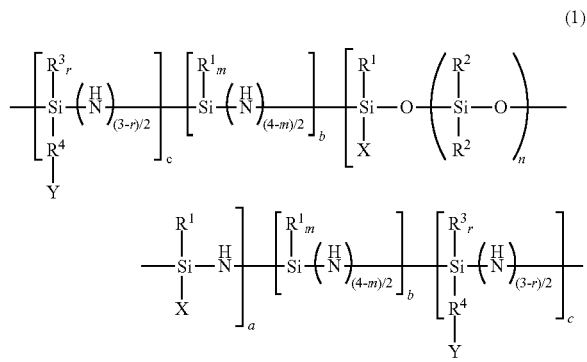

wherein $R^1$ represents a monovalent hydrocarbon group. $R^2$ represents a monovalent hydrocarbon group, $R^3$ represents an unsubstituted monovalent hydrocarbon group, $R^4$ represents a divalent hydrocarbon group having 2 to 20 carbon atoms, X represents a methyl group, Y represents a group of formula (2) or (3) below:

(Continued)

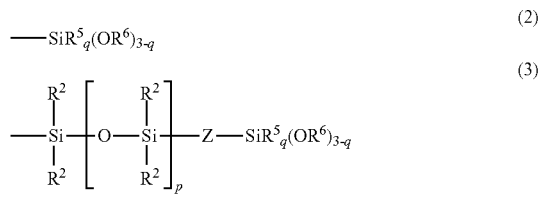
($R^2$ is same as above. $R^5$ and $R^6$ represent a monovalent hydrocarbon group, Z represents a divalent hydrocarbon group and the like, p is an integer of 0 to 9, and q is 0, 1, or 2.),
n is an integer of 11 to 500, m is 0, 1, or 2, r is 0 or 1, and a, b, and c are numbers that satisfy $0<a<1$, $0\leq b<1$, $0<c<1$, and $a+2b+2c=1$.
9 Claims, 12 Drawing Sheets
(51) Int. Cl.
*C08L 83/14* (2006.01)
*C09D 183/14* (2006.01)

POLYSILOXAZANE COMPOUND HAVING ALKOXYSILYL GROUP, PROCESS FOR PRODUCING SAME, AND COMPOSITION AND CURED PRODUCT INCLUDING SAME

CROSS-REFERENCE TO RELATED APPLICATION

This non-provisional application claims priority under 35 U.S.C. § 119(a) on Patent Application No. 2019-177517 filed in Japan on Sep. 27, 2019, the entire contents of which are hereby incorporated by reference.

TECHNICAL FIELD

The present invention relates to a polysiloxazane compound having an alkoxysilyl group, a process for producing the same, and a composition and a cured product including the same.

BACKGROUND ART

Silazane compounds are compounds having Si—N (silazane bond) and react with moisture in the air, which results in conversion of Si—N (silazane bond) to Si—O—Si (siloxane bond) (hydrolytic condensation). In general, Si—N is known to be more reactive than Si—OR (R is Si or an alkyl group).

Examples of typical silazane compounds include inorganic polysilazanes represented by the average composition of —[SiH$_2$—NH]$_n$— and hexamethyldisilazane.

A compound containing, in addition to a Si—N bond, a Si—O—Si bond as a constitutional unit is called a polysiloxazane compound. As such a polysiloxazane compound, for example, a reaction product of dichloromethylsilane, 1,3-dichlorotetramethyldisiloxane, and ammonia, a reaction product of dichloromethylsilane, 1,7-dichlorooctamethyltetrasiloxane, and ammonia, and a reaction product of dichloromethylsilane, a silicone oil modified with a silanol at both ends, and ammonia are known (see Patent Documents 1 and 2).

Such polysilazane compounds and polysiloxazane compounds are hydrolyzed to form a cured coating. The properties of the cured coating are changed depending on the substituent of the polysilazane compounds and the polysiloxazane compounds.

For example, a cured coating obtained from a compound free of organic substituents and having —[SiH$_2$—NH]$_n$— as a main structure, that is, an inorganic polysilazane, is glass-like and exhibits hydrophilicity. Meanwhile, in the case of an organic polysilazane compound having an average composition of R'—Si(NH)$_{3/2}$ (R' is a hydrogen atom or an organic group other than an organooxy group) as the main structure, if the organic polysilazane compound has an alkyl group such as a methyl group as an organic substituent, the obtained cured coating exhibits water-repellent property derived from an alkyl group.

Water-repellent property and water droplet-sliding property are one of the performances that are strongly required in the fields of car coating and exterior wall paint. On the surface of a substrate treated with a coating that exhibits water-repellent property and water droplet-sliding property, the attached water droplets flow down by a small action such as air convection and the gradient of the surface of the substrate. Thus, water droplets can be advantageously easily removed from the surface of the substrate.

CITATION LIST

Patent Document 1: JP-A 2018-534400
Patent Document 2: JP-A 2019-505645

SUMMARY OF THE INVENTION

Patent Documents 1 and 2 above disclose a polysiloxazane compound obtained from a silicone compound modified with a silanol at both ends or a silicone compound modified with a chloro compound at both ends having 1 to 10 dimethylsiloxane units, dichloromethylsilane, and ammonia.

However, such compounds presumably have insufficient water-repellent property because they have only a methyl group having one carbon atom as the organic substituent. These polysiloxazane compounds are linear compounds, and have a problem in that a cured coating cannot be formed even if they are hydrolytically condensed at room temperature.

Though the polysilazane compound having R'—Si(NH)$_{3/2}$ (R' represents a meaning same as above) as a main structure exhibits high water-repellent property if an alkyl group having a large number of carbon atoms is introduced into R', the water droplet-sliding property is not sufficient.

The present invention has been made in view of the above circumstances, and an object thereof is to provide a polysiloxazane compound that provides a cured coating excellent in water-repellent property and water droplet-sliding property, a process for producing the same, and a composition and a cured product including the same.

As a result of intensive studies to solve the above-mentioned problems, the present inventors have found that a polysiloxazane compound having both a dimethylpolysiloxane unit and an alkoxysilyl group provides a cured coating that exhibits good water-repellent property and water droplet-sliding property, thereby completing the invention.

That is, the present invention provides the following:
1. A polysiloxazane compound having an alkoxysilyl group, having an average composition of formula (1) below:

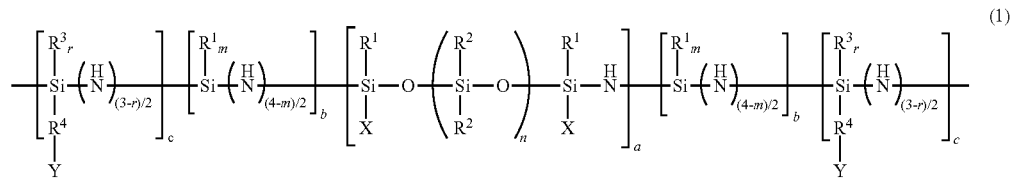

wherein R$^1$ each independently represents a substituted or unsubstituted monovalent hydrocarbon group having 1 to 50 carbon atoms that optionally contains O or S, R$^2$ each independently represents a substituted or unsubstituted monovalent hydrocarbon group having 1 to 10 carbon atoms, $R^3$ each independently represents an unsubstituted monovalent hydrocarbon group having 1 to 10 carbon atoms, $R^4$ each independently represents a substituted or unsubstituted divalent hydrocarbon group having 2 to 20 carbon atoms that optionally contains O, S, or Si, X each independently represents a methyl group, NH—$SiR^1X$, $(NH)_{(4-m/2)}$—$SiR^1_m$, or $(NH)_{(3-r/2)}$—$SiR^3_rR^4$—Y (wherein $R^1$, $R^3$, and $R^4$ represent a meaning same as above), Y represents a group of formula (2) or (3) below:

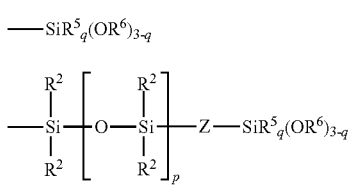

(wherein $R^2$ represents a meaning same as above, $R^5$ and $R^6$ each independently represent a substituted or unsubstituted monovalent hydrocarbon group having 1 to 10 carbon atoms, Z represents a substituted or unsubstituted divalent hydrocarbon group having 1 to 18 carbon atoms, or an oxygen atom, p is an integer of 0 to 9, and q is 0, 1, or 2), n is each independently an integer of 11 to 500, m is each independently 0, 1, or 2, r is each independently 0 or 1, and a, b, and c are numbers that satisfy $0<a<1$, $0\leq b<1$, $0<c<1$, and $a+2b+2c=1$. If X is NH—$SiR^1X$, $0\leq s\leq 2a$ (wherein s is a total number of X).

2. A process for producing the polysiloxazane compound having an alkoxysilyl group according to 1, including the steps of:
performing dehydrochlorination condensation between a silicone oil modified with OH at both ends of formula (4) below:

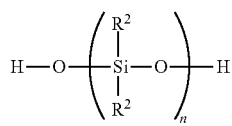

wherein $R^2$ and n represent a meaning same as above and a chlorosilane compound of formula (5) below:

$R^1_m$—$SiCl_{(4-m)}$ (5)

wherein $R^1$ and m represent a meaning same as above to obtain a chlorosiloxane compound of formula (6) below:

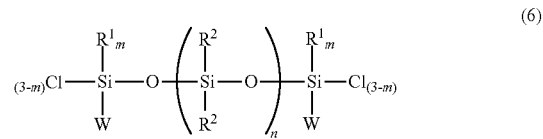

wherein W each independently represents a methyl group or a chlorine atom, and $R^1$ and m represent a meaning same as above,
performing ammonolysis polymerization by further adding a chlorosilane compound of formula (7) below:

wherein $R^{4'}$ represents a single bond, or a substituted or unsubstituted divalent hydrocarbon group having 1 to 10 carbon atoms that optionally contains O, S, or Si, and $R^3$ and r represent a meaning same as above
to the chlorosiloxane compound of formula (6) and a surplus of the chlorosilane compound of formula (5) to obtain an unsaturated bond-containing polysiloxazane compound of formula (8) below:

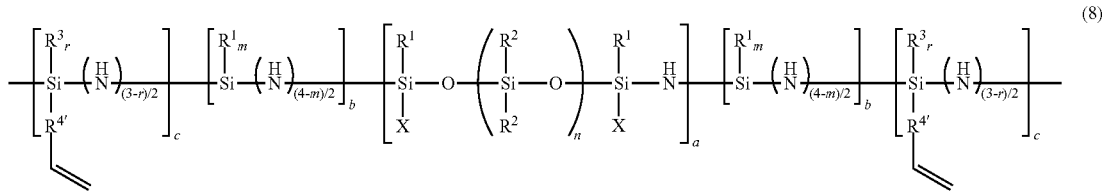

wherein $R^1$ to $R^3$, $R^{4'}$, a, b, c, n, m, r, and X represent a meaning same as above, and
performing addition reaction between the unsaturated bond-containing polysiloxazane compound of formula (8) and a mercapto group-containing silane compound of formula (9) below:

HS—$R^7$—$SiR^5_q(OR^6)_{3-q}$ (9)

wherein $R^7$ represents a divalent hydrocarbon group having 1 to 8 carbon atoms, and $R^6$, $R^7$, and q represent a meaning same as above
in presence of a radical generator.

3. A process for producing the polysiloxazane compound having an alkoxysilyl group according to 1, including the step of:
performing addition reaction between an unsaturated bond-containing polysiloxazane compound of formula (12) below:

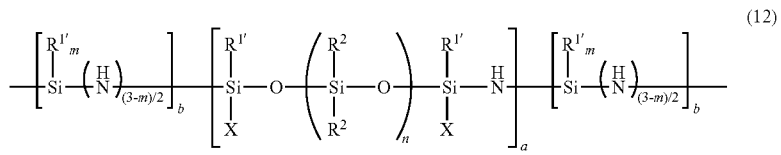

(12)

wherein $R^{1'}$ represents a meaning same as that of $R^1$ or $R^3$ above except that $R^{1'}$ necessarily contains an unsaturated bond. $R^1$, $R^2$, a, b, n, m, and X represent a meaning same as above and a mercapto group-containing silane compound of formula (9) below:

$$HS-R^7-SiR^5_q(OR^6)_{3-q} \qquad (9)$$

wherein $R^7$ is a divalent hydrocarbon group having 1 to 8 carbon atoms, and $R^5$, $R^6$, and q represent a meaning same as above in presence of a radical generator.

4. A process for producing the polysiloxazane compound having an alkoxysilyl group according to 1, including the steps of:

performing dehydrochlorination condensation between a silicone oil modified with OH at both ends of formula (4) below:

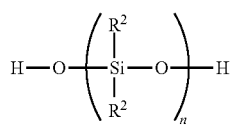

(4)

wherein $R^2$ and n represent a meaning same as above and a chlorosilane compound of formula (5) below:

$$R^1_m\text{-SiCl}_{(4-m)} \qquad (5)$$

wherein $R^1$ and m represent a meaning same as above to obtain a chlorosiloxane compound of formula (6) below:

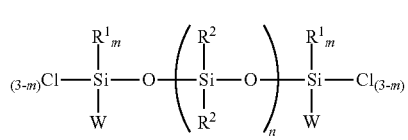

(6)

wherein W represents a methyl group or a chlorine atom, and $R^1$ and m represent a meaning same as above, performing ammonolysis polymerization by further adding a chlorosilane compound of formula (7) below:

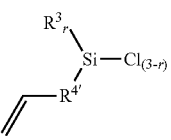

(7)

wherein $R^4$ represents a single bond, or a substituted or unsubstituted divalent hydrocarbon group having 1 to 10 carbon atoms that optionally contains O, S, or Si, and $R^3$ and r represent a meaning same as above to the chlorosiloxane compound of formula (6) to obtain an unsaturated bond-containing polysiloxazane compound of formula (8) below:

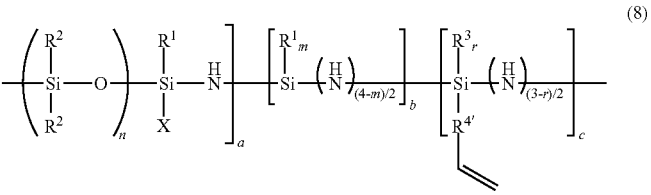

(8)

wherein $R^1$ to $R^3$, $R^{4'}$, a, b, c, n, m, r, and X represent a meaning same as above, and performing addition reaction between the unsaturated bond-containing polysiloxazane compound of formula (8) and a hydrogen silane compound of formula (13) or (14) below:

$$H-SiR^5_q(OR^6)_{3-q} \qquad (13)$$

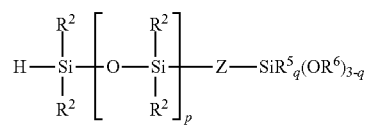

(14)

wherein $R^2$, $R^5$, $R^6$, p, q, and Z represent a meaning same as above in presence of a platinum catalyst.

5. A process for producing the polysiloxazane compound having an alkoxysilyl group according to 1, including the step of:

performing addition reaction between an unsaturated bond-containing polysiloxazane compound of formula (12) below:

$$\left[\begin{array}{c}R^{1'}{}_m \\ | \\ Si-(N)_{(3-m)/2} \\ | \\ H \end{array}\right]_b \left[\begin{array}{c} R^{1'} \\ | \\ Si-O \\ | \\ X \end{array} \left(\begin{array}{c} R^2 \\ | \\ Si-O \\ | \\ R^2 \end{array}\right)_n \begin{array}{c} R^{1'} \\ | \\ Si-N \\ | \\ X \end{array} \begin{array}{c} H \\ \end{array} \right]_a \left[\begin{array}{c} R^{1'}{}_m \\ | \\ Si-(N)_{(3-m)/2} \\ | \\ H \end{array}\right]_b \quad (12)$$

wherein R[1'] represents a meaning same as that of R[1] or R[3] above except that R[1'] necessarily contains an unsaturated bond. R[1], R[2], a, b, n, m, and X represent a meaning same as above and a hydrogen silane compound of formula (13) or (14) below:

$$H-SiR^5_q(OR^6)_{3-q} \quad (13)$$

$$H-\begin{array}{c}R^2 \\ | \\ Si \\ | \\ R^2\end{array}-O\left[\begin{array}{c}R^2 \\ | \\ Si \\ | \\ R^2\end{array}\right]_p -Z-SiR^5_q(OR^6)_{3-q} \quad (14)$$

wherein R[2], R[5], R[6], p, q, and Z represent a meaning same as above in presence of a platinum catalyst.
6. A composition including:
   the polysiloxazane compound having an alkoxysilyl group according to 1; and
   a solvent.
7. The composition according to 6, further including:
   at least one metal compound selected from a titanium compound, an aluminum compound, a zinc compound, and a tin compound.
8. A cured product obtained by curing the composition according to 6 or 7.

Advantageous Effects of the Invention

The polysiloxazane compound having an alkoxysilyl group of the present invention has a dimethylsiloxane unit in the main skeleton and an alkoxysilyl group as a substituent, and thus the dimethylpolysiloxane unit in the main skeleton exhibits good water-repellent property and water droplet-sliding property. By the simultaneous hydrolytic condensation of the alkoxysilyl group and the silazane site, a coating can be formed even at room temperature.

DESCRIPTION OF THE PREFERRED EMBODIMENT

Figure 1:
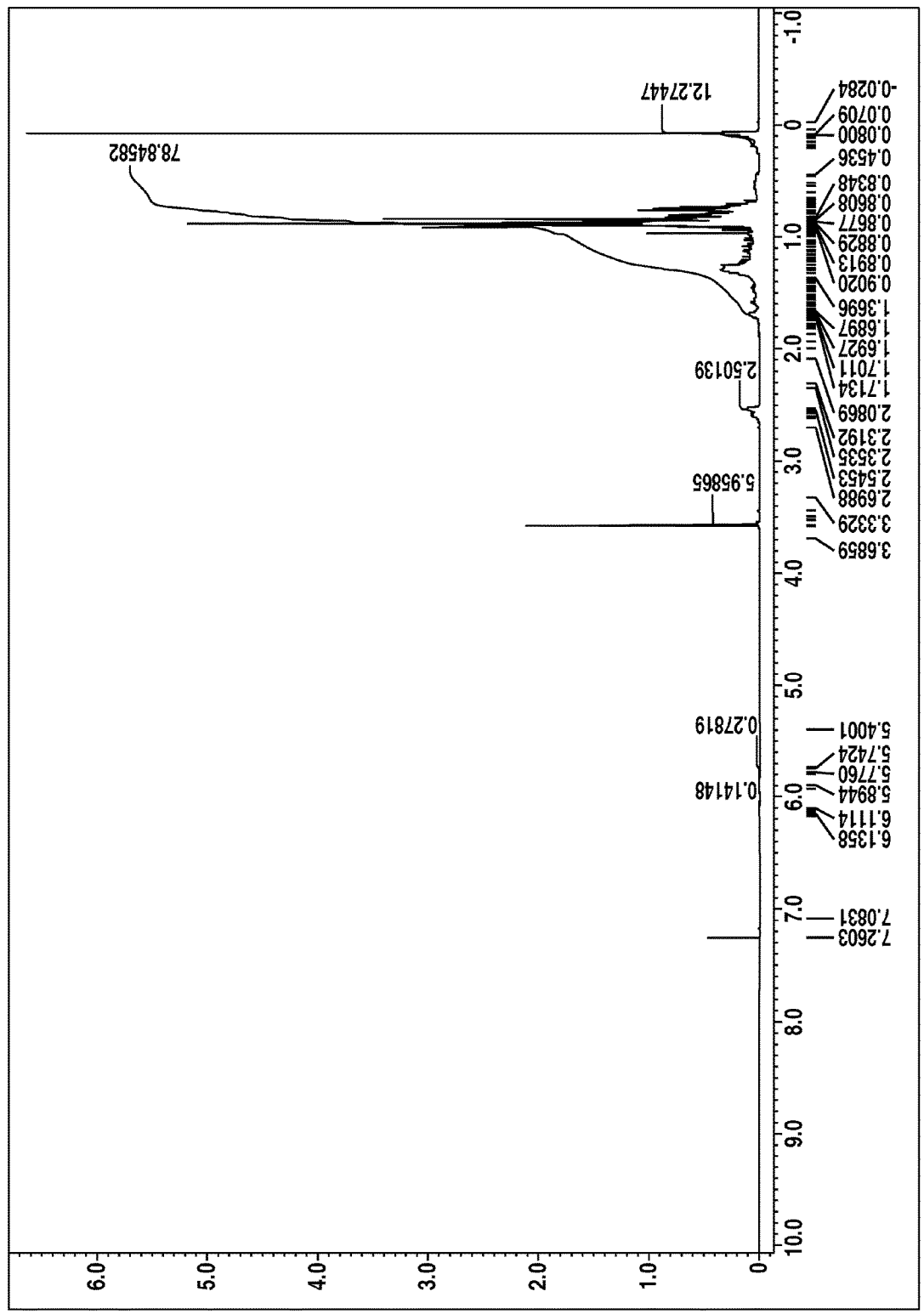
FIG. 1 is a $^1$H-NMR spectrum of the polysiloxazane compound obtained in Example 1-1.

Hereinafter, the present invention is specifically described.

[Alkoxysilyl Group-Containing Polysiloxazane Compound]

The polysiloxazane compound according to the present invention has an average composition of formula (1) below.

$$\left[\begin{array}{c}R^3{}_r \\ | \\ Si-(N)_{(3-r)/2} \\ | \\ R^4 \\ | \\ Y \end{array}\right]_c \left[\begin{array}{c}R^1{}_m \\ | \\ Si-(N)_{(4-m)/2} \\ | \\ H \end{array}\right]_b \left[\begin{array}{c} R^1 \\ | \\ Si-O \\ | \\ X \end{array} \left(\begin{array}{c} R^2 \\ | \\ Si-O \\ | \\ R^2 \end{array}\right)_n \begin{array}{c} R^1 \\ | \\ Si-N \\ | \\ X \end{array} \begin{array}{c} H \\ \end{array} \right]_a \left[\begin{array}{c}R^1{}_m \\ | \\ Si-(N)_{(4-m)/2} \\ | \\ H \end{array}\right]_b \left[\begin{array}{c}R^3{}_r \\ | \\ Si-(N)_{(3-r)/2} \\ | \\ R^4 \\ | \\ Y \end{array}\right]_c \quad (1)$$

In formula (1), R[1] represents each independently a substituted or unsubstituted monovalent hydrocarbon group having 1 to 50 carbon atoms, preferably having 1 to 20 carbon atoms, more preferably having 1 to 10 carbon atoms that optionally contains O or S.

Specific examples of the monovalent hydrocarbon group of R[1] include linear alkyl groups such as a methyl, an ethyl, an n-propyl, an n-butyl, an n-pentyl, an n-hexyl, an n-heptyl, an n-octyl, a decyl, a dodecyl, a tetradecyl, a hexadecyl, and an octadecyl group; branched alkyl groups such as an isopropyl, an isobutyl, a sec-butyl, a tert-butyl, a neopentyl, a texyl, and a 2-ethylhexyl group; cyclic alkyl groups having 3 to 50 carbon atoms, preferably having 5 to 20 carbon atoms such as a cyclopentyl and a cyclohexyl group; alkenyl groups having 2 to 50 carbon atoms, preferably having 2 to 20 carbon atoms such as a vinyl, an allyl(2-propenyl), a 1-propenyl, a butenyl, and a pentenyl group; aryl groups having 6 to 50 carbon atoms, preferably having 6 to 20 carbon atoms such as a phenyl and a tolyl group; and aralkyl groups having 7 to 50 carbon atoms, preferably having 7 to 20 carbon atoms such as a benzyl and a phenethyl group.

Specific examples of the monovalent hydrocarbon group that contains O or S of $R^1$ include an oxyalkyl, an alkyleneoxyalkyl, a thioalkyl, and an alkylenethioalkyl group, and examples of these alkyl groups each independently include the same substituents as groups exemplified above in linear, branched, and cyclic alkyl groups having 1 to 50 carbon atoms.

In the monovalent hydrocarbon group of R, a part or all of the hydrogen atoms can be substituted with other substituents. Specific examples of such substituents include a fluorine atom; aryl groups having 6 to 9 carbon atoms such as a phenyl and a tolyl group; aralkyl groups having 7 to 9 carbon atoms such as a benzyl and a phenethyl group; and a siloxanyl group of formula (15) below.

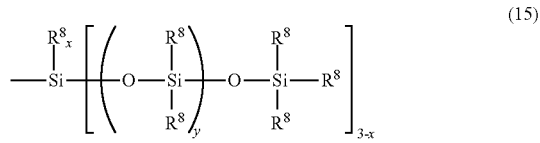
(15)

In formula (15), $R^8$ each independently represents a substituted or unsubstituted monovalent hydrocarbon group having 1 to 10 carbon atoms, preferably having 1 to 6 carbon atoms, and a part or all of the hydrogen atoms in the monovalent hydrocarbon groups can be substituted with a fluorine atom.

Examples of the monovalent hydrocarbon group of $R^8$ include linear alkyl groups such as a methyl, an ethyl, an n-propyl, an n-butyl, an n-pentyl, an n-hexyl, an n-heptyl, an n-octyl, and a decyl group; branched alkyl groups such as an isopropyl, an isobutyl, a sec-butyl, a tert-butyl, a neopentyl, a texyl, and a 2-ethylhexyl group; cyclic alkyl groups such as a cyclopentyl and a cyclohexyl group: alkenyl groups such as a vinyl, an allyl(2-propenyl), a 1-propenyl, a butenyl, and a pentenyl group; aryl groups such as a phenyl and tolyl group; and aralkyl groups such as a benzyl and a phenethyl group.

x represents an integer of 0, 1, or 2, and if x is 0 or 1, multiple $OSiR^8_3$ groups can be desiloxane-condensed to form a cyclic siloxane.

y represents an integer of 0 to 20, preferably 0 to 15, more preferably 0 to 8.

In formula (15) above, the combination of $R^8$, x, and y is arbitrary and is not particularly limited.

Specific examples of the siloxanyl group of formula (15) which is defined by such $R^8$, x, and y include polyalkylpolysiloxanyl groups such as a 1,1,1,3,3-pentamethyldisiloxanyl, a 1,1,1,3,3,5,5-heptamethyltrisiloxanyl, and a 1,1,1,3,3,5,5,7,7-nonamethyltetrasiloxanyl group; polyalkylcyclopolysiloxanyl groups such as a 1,1,3,3,5-pentamethylcyclotrisiloxanyl, a 1,1,3,3,5,5,7-heptamethylcyclotetrasiloxanyl, and a 1,1,3,3,5,5,7,7,9-nonamethylcyclopentasiloxanyl group; and polyphenylpolysiloxanyl groups such as a 3,5-diphenyl-1,1,1,3,5-pentamethyltrisiloxanyl, a 1,1,1,3,5,7-hexamethyl-3,5,7-triphenyltetrasiloxanyl, a 1,1,1,3,5,7,9-heptamethyl-3,5,7,9-tetraphenylpentasiloxanyl, a 3,3,5,5-tetraphenyl-1,1,1-trimethyltrisiloxanyl, a 3,3,5,5,7,7-hexaphenyl-1,1,1-trimethyltetrasiloxanyl, and a 3,3,5,5,7,7,9,9-octaphenyl-1,1,1-trimethylpentacyloxanyl group.

In formula (1), $R^2$ each independently represent a substituted or unsubstituted monovalent hydrocarbon group having 1 to 10 carbon atoms, preferably having 1 to 6 carbon atoms. Examples of the monovalent hydrocarbon group include the same groups as those exemplified in R.

In the monovalent hydrocarbon group of $R^2$, a part or all of the hydrogen atoms can be substituted with a fluorine atom. Specific examples of the monovalent hydrocarbon group substituted with a fluorine atom include fluoroalkyl groups such as a (3,3,3-trifluoro)propyl, a (3,3,4,4,5,5,6,6,6)nonafluorohexyl, and a (3,3,4,4,5,5,6,6,7,7,8,8)-tridecafluorooctyl group.

$R^3$ above each independently represents an unsubstituted monovalent hydrocarbon group having 1 to 10 carbon atoms, preferably having 1 to 6 carbon atoms. Examples of the monovalent hydrocarbon group include the same groups as those exemplified in $R^8$.

$R^4$ above each independently represents a substituted or unsubstituted divalent hydrocarbon group having 2 to 20 carbon atoms, preferably having 2 to 10 carbon atoms, more preferably having 2 to 5 carbon atoms that optionally contains O, S, or Si.

Specific examples of the divalent hydrocarbon group of $R^4$ include linear alkylene groups such as a methylene, an ethylene, a trimethylene, a tetramethylene, a hexamethylene, an octamethylene, and a decylene group; branched alkylene groups such as a propylene (methylethylene) and a methyltrimethylene group; cyclic alkylene groups such as a cyclohexylene and a methylenecyclohexylenemethylene group; alkenylene groups such as a propenylene, a butenylene, a hexenylene, and an octenylene group; arylene groups such as a phenylene group; and aralkylene groups such as a methylenephenylene and a methylenephenylenemethylene group.

Specific examples of the divalent hydrocarbon group that contains O, S, or Si of $R^4$ include an oxyalkylene group, an alkyleneoxyalkylene, a thioalkylene, an alkylenethioalkylene, a dialkylsilylalkylene, and an alkylenedialkylsilylalkylene group, and examples of these alkylene groups each independently include the same substituents as the groups exemplified above for the linear, branched, and cyclic alkylene groups having 1 to 20 carbon atoms.

In the divalent hydrocarbon group of $R^4$, a part or all of the hydrogen atoms can be substituted with a fluorine atom. Specific examples of the divalent hydrocarbon group substituted with a fluorine atom include alkylene fluoroalkylene alkylene groups such as an ethylene tetrafluoroethylene ethylene, an ethylene hexafluoropropylene ethylene, an ethylene octafluorobutylene ethylene, an ethylene hexadecafluorohexylene ethylene, a propylene octafluorobutylene propylene, a propylene hexadecafluorohexylene propylene, a hexylene octafluorobutylene hexylene, and a hexylene hexadecafluorohexYlene hexylene group.

X above each independently represents a methyl group, NH—$SiR^1X$ corresponding to the unit a in the formula (1), $(NH)_{(3-m/2)}$—$SiR^1_m$ corresponding to the unit b in the formula (1) or $(NH)_{(3-r/2)}$—$SiR^3_rR^4$—Y corresponding to the unit c in the formula (1) (these $R^1$, $R^3$, and $R^4$ represent a meaning same as above).

Y above represents a group of formula (2) or (3) below.

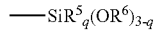
(2)

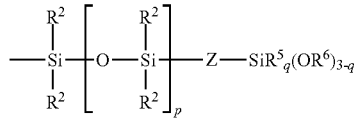
(3)

In formula (2) or (3), $R^2$ represents a meaning same as above, $R^5$ and $R^6$ each independently represent a substituted or unsubstituted monovalent hydrocarbon group having 1 to 10 carbon atoms, preferably having 1 to 5 carbon atoms, Z represents a substituted or unsubstituted divalent hydrocarbon group having 1 to 18 carbon atoms, preferably having 2 to 12 carbon atoms, more preferably having 2 to 8 carbon atoms, or an oxygen atom, p is an integer of 0 to 9, preferably 1 to 5, and q is 0, 1, or 2.

In formula (2) or (3), specific examples of $R^5$ and $R^6$ include the same groups as those exemplified for $R^8$, and specific examples of Z include the same groups as those exemplified for $R^4$.

If Z is a divalent hydrocarbon group, a part or all of the hydrogen atoms can be substituted with a fluorine atom, and specific examples thereof also include the same groups as those of the divalent hydrocarbon group substituted with a fluorine atom of $R^4$.

In formula (1), n is each independently an integer of 11 to 500. However, n is preferably an integer of 11 to 350, more preferably an integer of 11 to 100 from the viewpoint of ease in procurement of raw materials.

m is each independently 0, 1, or 2, r is each independently 0 or 1, and a, b, and c are numbers that satisfy $0 < a < 1$, $0 \leq b < 1$, $0 < c < 1$, and $a + 2b + 2c = 1$. If X is NH—SiR$^1$X, $0 \leq s \leq 2a$ (wherein s is a total number of X).

The weight average molecular weight of the polysiloxazane compound having the average composition of formula (1) above is not particularly limited, and is preferably 3,000 to 300,000, more preferably 3,000 to 200,000 in terms of polystyrene in gel permeation chromatography (hereinafter, referred to as GPC). GPC conditions are as described in Examples.

[Process for Production]

Next, a process for producing the polysiloxazane compound of formula (1) (hereinafter, referred to as Polysiloxazane (1)) is described.

The alkoxysilyl group-containing polysiloxazane compound of the present invention can be obtained by, for example, a process for production in which an unsaturated bond-containing polysiloxazane compound of formula (8) below (hereinafter, referred to as Unsaturated bond-containing polysiloxazane compound (8)) is used as a starting material, and a process for production in which an unsaturated bond-containing polysiloxazane compound of formula (12) below (hereinafter, referred to as Unsaturated bond-containing polysiloxazane compound (12)) is used as a starting material.

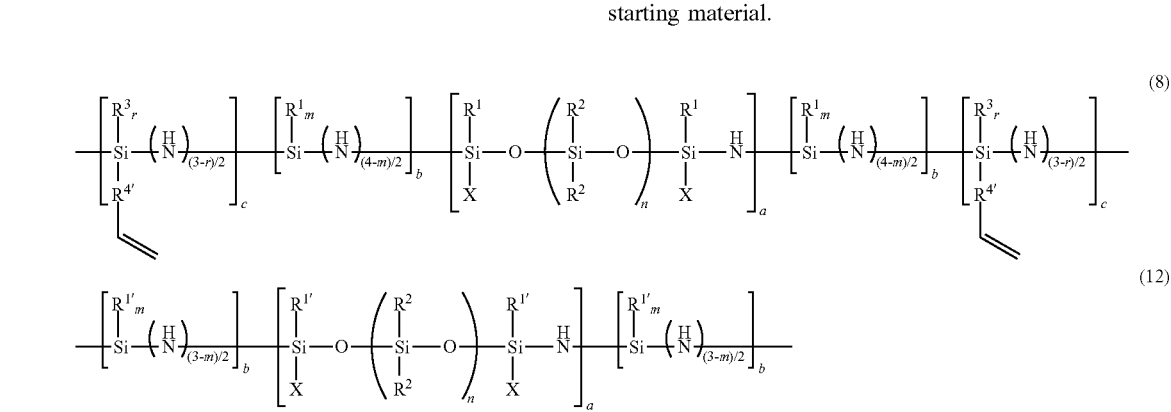
(8)

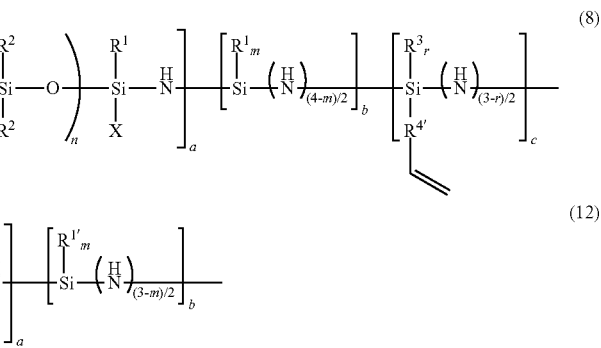
(12)

The weight average molecular weight of Unsaturated bond-containing polysiloxazane compounds (8) and (12) in terms of polystyrene in GPC is not particularly limited, and is preferably 2,500 to 200.000, more preferably 2,500 to 150.000.

A process for producing Polysiloxazane compound (1) in which Unsaturated bond-containing poysiloxazane compound (8) is used as a starting material is first described.

Unsaturated bond-containing polysiloxazane compound (8) can be obtained by, for example, mixing a silicone oil modified with OH at both ends of formula (4) below (hereinafter, referred to as Silicone oil modified with OH at both ends (4)) and a chlorosilane compound of formula (5) (hereinafter, referred to as Chlorosilane compound (5)), to perform dehydrochlorination condensation to obtain a chlorosiloxane compound of formula (6) (hereinafter, referred to as Chlorosiloxane compound (6)), then adding a chlorosilane compound of formula (7) (hereinafter, referred to as Chlorosilane compound (7)), and introducing ammonia thereto.

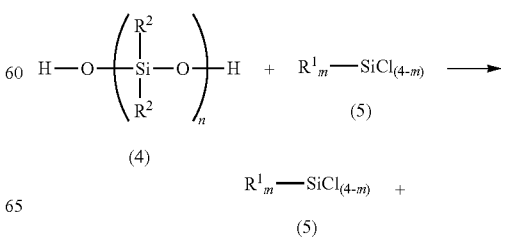
(4)
(5)
(5)

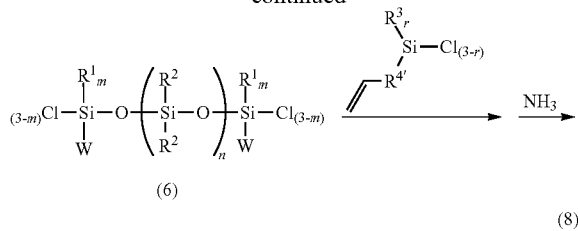

(6)

(8)

In these formulas, $R^1$, $R^2$, $R^3$, m, and r represent a meaning same as above. $R^{4'}$ represents a single bond, or a substituted or unsubstituted divalent hydrocarbon group having 1 to 10 carbon atoms that optionally contains O, S, or Si, and W represents a methyl group or a chlorine atom.

Specific examples of the divalent hydrocarbon group of R include the same substituents as those of $R^4$, and a methylene group is preferable.

Silicone oil modified with OH at both ends (4) preferably has a kinematic viscosity at 25° C. of 20 to 5,000 mm²/s, more preferably 30 to 1,500 mm/s. In formula (4), the relationship between the kinematic viscosity and n is as follows: $11 \leq n \leq 400$ in 20 to 5,000 mm²/s and $13 \leq n \leq 300$ in 30 to 1,500 mm²/s. The kinematic viscosity is a measurement value determined by an Ubbelohde viscometer.

Specific examples of Chlorosilane compound (5) include tetrachlorosilane:

trichlorosilane compounds such as methyltrichlorosilane, ethyltrichlorosilane, propyltrichlorosilane, hexyltrichlorosilane, cyclohexyltrichlorosilane, octyltrichlorosilane, decyltrichlorosilane, dodecyltrichlorosilane, hexadecyltrichlorosilane, octadecyltrichlorosilane, isobutyltrichlorosilane, 2-methylpentyltrichlorosilane, 2-ethylhexyltrichlorosilane, 2-propenyltrichlorosilane, phenyltrichlorosilane, benzyltrichlorosilane, phenethyltrichlorosilane, phenylbutyltrichlorosilane, phenyloctyltrichlorosilane, 1,4-vinylphenyltrichlorosilane, 1,2-trimethylsiloxyphenylpropyltrichlorosilane, trichlorosilylpropyl methyl ether, trichlorosilylpropyl methyl sulfide, trichlorosilylpropyl phenyl ether, trichlorosilylpropyl phenyl sulfide, 1-tris(trimethylsiloxy)silyl-2-trichlorosilylethane, 1-tris (trimethylsiloxy) silyl-6-trichlorosilylhexane, 1-tris(trimethylsiloxy)silyl-8-trichlorosilyloctane, bis(1,1,1,3,3-pentamethyldisiloxy)methyls-ilyltrichlorosilane, 1-bis(trimethylsiloxy)methylsilyl-2-trichlorosilylethane, 1-bis(trimethylsiloxy)methylsilyl-6-trichlorosilylhexane, 1-bis(trimethylsiloxy)methylsilyl-8-trichlorosilyloctane, 1-trimethylsiloxydimethylsilyl-2-trichlorosilylethane, 1-trimethylsiloxydimethylsilyl-6-trichlorosilylhexane, 1-trimethylsiloxydimethylsilyl-8-trichlorosilyloctane, 1-trimethylsiloxydimethylsilyl-2-trichlorosilyloctane, 1,1,3,3,5,5,7-heptamethyl-7-trichlorosilylethylcyclotetrasiloxane, 1-(1,1,1,3,3,5,5,7,7,9,9-undecamethylpentasiloxy)dimethylsilyl-2-trichlorosilylethane, 1-(1,1,1,3,3,5,5,7,7,9,9,11,11,13,13,15,15,17,17,19,19-henicosamethyldecasiloxy)-dimethylsilyl-2-trichlorosilylethane, 1-(1,1,1,3,3,5,5,7,7,9,9-undecamethylpentasiloxy)dimethylsilyl-6-trichlorosilylhexane, 1-(1,1,1,3,3,5,5,7,7,9,9,11,11,13,13,15,15,17,17,19,19-henicosamethyldecasiloxy)-dimethylsilyl-6-trichlorosilylhexane, 1-(1,1,1,3,3,5,5,7,7,9,9-undecamethylpentasiloxy)dimethylsilyl-8-trichlorosilyloctane, 1-(1,1,1,3,3,5,5,7,7,9,9,11,11,13,13,15,15,17,17,19,19-henicosamethyldecasiloxy)-dimethylsilyl-8-trichlorosilyloctane, (3,3,3)-trifluoropyrtrichlorosilane, (3,3,4,4,5,5,6,6,6)-nonafluorohexyltrichlorosilane, and (3,3,4,4,5,5,6,6,7,7,8,8,8)tridecafluorooctyltrichlorosilane;

dichlorosilane compounds such as dimethyldichlorosilane, ethylmethyldichlorosilane, propylmethyldichlorosilane, hexylmethyldichlorosilane, cyclohexylmethyldichlorosilane, octylmethyldichlorosilane, decylmethyldichlorosilane, dodecylmethyldichlorosilane, hexadecylmethyldichlorosilane, octadecylmethyldichlorosilane, diethyldichlorosilane, dibutyldichlorosilane, diisopropyldichlorosilane, dicyclopentyldichlorosilane, isobutylmethyldichlorosilane, 2-methylpentylmethyldichlorosilane, 2-ethylhexylmethyldichlorosilane, 2-propenylmethyldichlorosilane, phenylmethyldichlorosilane, benzylmethyldichlorosilane, phenethylmethyldichlorosilane, phenylbutylmethyldichlorosilane, phenyloctylmethyldichlorosilane, 1,4-vinylphenylmethyldichlorosilane, 1,2-(trimethylsiloxy)phenylpropylmethyldichlorosilane, methyldichlorosilylpropylmethyl ether, methyl dichlorosilylpropyl methyl sulfide, methyl dichlorosilylpropyl phenyl ether, methyldichlorosilylpropylphenyl sulfide, 1-tris(trimethylsiloxy)silyl-2-methyldichlorosilylethane, 1-bis(tnmethylsiloxy)methylsilyl-2-methyldichlorosilylethane, 1-(trimethylsiloxy)dimethylsilyl-2-trichlorosilylethane, 1,1,3,3,5,5,7-heptamethyl-7-methyldichlorosilylethylcyclotetrasiloxane, 1-(1,1,1,3,3,5,5,7,7,9,9-undecamethylpentasiloxy)dimethylsilyl-2-methyldichlorosilylethane, 1-(1,1,1,3,3,5,5,7,7,9,9,11,11,13,13,15,15,17,17,19, 19-henicosamethyldecasiloxy)-dimethylsilyl-2-methyldichlorosilylethane, 1-(1,1,1,3,3,5,5,7,7,9,9-undecamethylpentasiloxy)dimethylsilyl-6-methyldichlorosilylhexane, 1-(1,1, 1,3,3,5,5,7,7,9,9,11,11,13,13,15,15,17,17,19,19-henicosamethyldecasiloxy)-dimethylsilyl-6-methyldichlorosily-lhexane, 1-(1,1,1,3,3,5,5,7,7,9,9-undecamethylpentasiloxy) dimethylsilyl-8-methyldichlorosilyloctane, 1-(1,1,1,3,3,5,5, 7,7,9,9,11,11,13,13,15,15,17,17,19,19-henicosamethyldecasiloxy)-dimethylsilyl-8-methyldichlorosilyloctane, (3,3,3)-trifluoropyrmethyldichlorosilane, (3,3,4,4,5,5,6,6,6)-nonafluorohexylmethyldichlorosilane, and (3,3,4,4,5,5,6,6,7,7,8,8,8)tridecafluorooctylmethyldichlorosilane;

unsaturated bond-containing trichlorosilane compounds such as vinyltrichlorosilane, allyltrichlorosilane, hexenyltrichlorosilane, octenyltrichlorosilane, 1-vinyl-3-trichlorosilylethyl-1,1,3,3-tetramethyldisiloxane, 1-allyl-3-trichlorosilylpropyl-1,1,3,3-tetramethyldisiloxane, 1-hexenyl-3-trichlorosilylhexyl-1,1,3,3-tetramethyldisiloxane, 1-octenyl-3-trichlorosilylhexyl-1,1,3,3-tetramethyldisiloxane, 1-vinyl-9-trichlorosilylethyl-1,1,3,3,5,5,7,7,9,9-decamethylpentasiloxane, 1-vinyl-15-trichlorosilylethyl-1,1,3,3,5,5, 7,7,9,9,11,11,13,13,15,15-hexadecamethylpentasiloxane, 1-trichlorosilyl-3,3,4,4,5,5,6,6-octafluoro-7-octene, 1-trichlorosilyl-3,3,4,4,5,5,6,6,7,7,8,8-dodecafluoro-9-decene; and unsaturated bond-containing alkyldichlorosilane compounds such as vinylmethyldichlorosilane, vinylphenyldichlorosilane, allylmethyldichlorosilane, allylphenyldichlorosilane, hexenylmethyldichlorosilane, octenylmethyldichlorosilane, 1-vinyl-3-methyldichlorosilylethyl-1,1,3,3-tetramethyldisiloxane, 1-allyl-3-methyldichlorosilylpropyl-1,1,3,3-tetramethyldisiloxane, 1-hexenyl-3-methyldichlorosilylhexyl-1,1,3,3-tetramethyldisiloxane, 1-octenyl-3-methyldirolosilylhexyl-1,1,3,3-tetramethyldisiloxane, 1-vinyl-9-methyldichlorosilylethyl-1,1,3,3,5,5,7,7,9,9-decamethylpentasiloxane, 1-vinyl-15-methyldichlorosilylethyl-1, 1,3,3,5,5,7,7,9,9,11,11,13,13,15,15-hexadecamethylpentasiloxane, and 1-methyldichlorosilyl-3,3,4,4,5,5,6,6-octafluoro-7-octene, 1-trichlorosilyl-3,3,4,4,5,5,6,6,7,7,8,8-dodecafluoro-9-decene.

The mixing ratio between Silicone oil modified with OH at both ends (4) and Chlorosilane compound (5) is not particularly limited, and the amount of Chlorosilane compound (5) is preferably 5 to 30 mol, more preferably 5 to 20 mol, and still more preferably 7 to 15 mol per mol of the amount of substance of the OH groups in Silicone oil modified with OH at both ends (4) from the viewpoint of imparting water droplet-sliding property to the obtained cured product.

Specific examples of Chlorosilane compound (7) include the same compounds as those containing an unsaturated bond in specific examples of Chlorosilane compound (5).

The amount of Chlorosilane compound (7) used is not particularly limited, and is preferably 0.5 to 10 mol, more preferably 1 to 5 mol, still more preferably 1 to 3 mol per mol of Chlorosilane compound (5).

Ammonolysis polymerization is performed by introducing ammonia into a mixture of Chlorosilane compound (5), Chlorosiloxane compound (6), and Chlorosilane compound (7) prepared as described above for reaction.

Though ammonolysis polymerization proceeds without a solvent, a solvent is preferably used because ammonium chloride is by-produced as the reaction proceeds, making stirring difficult.

Examples of the solvent include hydrocarbon solvents such as pentane, hexane, cyclohexane, isooctane, benzene, toluene, and xylene; ether solvents such as diethyl ether, tetrahydrofuran, 4-methyltetrahydropyran, cyclopentyl methyl ether, dioxane, and dipropylene glycol dimethyl ether; ester solvents such as ethyl acetate, isopropyl acetate, and butyl acetate; and siloxane solvents such as hexamethyldisiloxane, tris(trimethylsiloxy)methylsilane, octamethylcyclotetrasiloxane, and decamethylcyclopentasiloxane, and these solvents can be used alone or in combination of two or more.

Though ammonolysis polymerization proceeds without a catalyst, the reaction time can be shortened by adding a catalyst.

Specific examples of the catalyst include Bronsted acids such as methanesulfonic acid, benzenesulfonic acid, dodecylbenzenesulfonic acid, trifluoromethanesulfonic acid, acetic acid, propionic acid, benzoic acid, and trifluoroacetic acid.

The addition amount of the catalyst is not particularly limited, and is preferably 0.001 to 0.1 mol, more preferably 0.005 to 0.1 mol per mol of Chlorosilane compound (5) from the viewpoint of the effect of addition of the catalyst or the suppression of the side reaction.

The reaction temperature is not particularly limited, and is preferably −78 to 100° C., more preferably −78 to 50° C., and still more preferably −10 to 20° C. from the viewpoint of sublimation of ammonium chloride or the reaction rate.

The reaction time is preferably 30 minutes to 24 hours, more preferably 3 hours to 15 hours, from the viewpoint of the reaction rate or suppression of the side reaction. Further, the atmosphere in which the reaction is performed is not particularly limited, and an atmosphere of inert gases such as nitrogen or argon is preferable to avoid hydrolysis of the raw material.

An unsaturated bond-containing polysiloxazane compound can be recovered by removing by-produced ammonium chloride from the reaction liquid after completion of the reaction. Examples of the method for removing ammonium chloride include a filtration method and a liquid separation method of dissolving and then separating ammonium chloride using an aqueous alkali solution.

In particular, from the viewpoint of improving the yield, a method of dissolving and separating the salt using an aqueous alkali solution is preferable. Examples of the alkali component used in this case include alkali metal hydroxides such as lithium hydroxide, sodium hydroxide, and potassium hydroxide; and alkali earth metal hydroxides such as calcium hydroxide. The concentration of the aqueous alkali solution is preferably 5 to 52%, more preferably 15 to 52%, and still more preferably 25 to 48%, from the viewpoint of product stability and productivity.

The amount used of the alkali component such as an alkali metal hydroxide is preferably 1 to 2 mol, more preferably 1 to 1.5 mol per mol of the produced ammonium chloride, from the viewpoint of yield or product stability.

As a process for producing Polysiloxazane compound (1) from Unsaturated bond-containing polysiloxazane compound (8) thus obtained, there are two processes: a process in which addition reaction of the mercapto group-containing silane compound (hereinafter, referred to as Mercapto group-containing silane compound (9)) of formula (9) below is performed in presence of a radical generator and a process in which addition reaction of the hydrogen silane compound of formula (13) or (14) (hereinafter, referred to as Hydrogen silane compound (13) or (14)) is performed.

In the addition reaction in which a platinum catalyst is used, if the raw material contains a sulfur atom, it may act as a catalyst poison, and the reaction efficiency may be significantly deteriorated, or the desired compound may not be obtained. Thus, if $R^1$ and/or $R^{4'}$ in Unsaturated bond-containing polysiloxazane compound (8) contain a sulfur atom, the addition reaction in which Mercapto group-containing silane compound (9) is used is preferably selected.

Meanwhile, if no problem occurs in the use of a platinum catalyst, Polysiloxazane compound (1) can be produced by any of the process of adding Mercapto group-containing silane compound (9) and the process of adding Hydrogen silane compound (13) or (14).

There is described a process for producing Polysiloxazane compound (1) by performing addition reaction of Mercapto group-containing silane compound (9) in presence of a radical generator to introduce an alkoxysilyl group to Unsaturated bond-containing polysiloxazane compound (8).

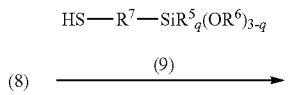

-continued

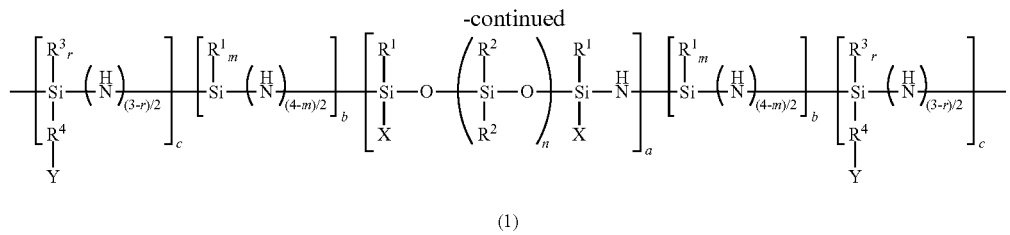

(1)

In these formulae, $R^1$ to $R^6$, a, b, c, n, p, q, r, X and Y represent a meaning same as above.

In formula (9), $R^1$ is a divalent hydrocarbon group having 1 to 8 carbon atoms, preferably having 1 to 5 carbon atoms.

Specific examples of $R^7$ include linear alkylene groups such as a methylene, an ethylene, a trimethylene, a tetramethylene, a hexamethylene, and an octamethylene group; branched alkylene groups such as a propylene (methylethylene) and a methyltrimethylene group; cyclic alkylene groups such as a cyclohexylene and a methylenecyclohexylenemethylene group; alkenylene groups such as a propenylene, a butenylene, a hexenylene, and an octenylene group; arylene groups such as a phenylene group; and aralkylene groups such as a methylenephenylene and a methylenephenylenemethylene group.

Specific examples of Mercapto group-containing silane compound (9) include mercaptoalkyltrialkoxysilane compounds such as mercaptopropyltrimethoxysilane, mercaptopropyltriethoxysilane, mercaptopropyltripropoxysilane, mercaptopropyltriisopropoxysilane, mercaptomethyltrimethoxysilane, mercaptoethyltriethoxysilane, mercaptohexyltrimethoxysilane, mercaptohexyltriethoxysilane, mercaptooctyltrimethoxysilane, and mercaptooctyltriethoxysilane; mercaptoalkylalkyldialkoxysilanes such as mercaptopropylmethyldimethoxysilane, mercaptomethylmethyldimethoxysilane, mercaptohexylmethyldimethoxysilane, mercaptooctylmethyldimethoxysilane, mercaptopropylphenyldimethoxvsilane, mercaptomethylphenyldimethoxvsilane, mercaptohexylphenyldimethoxysilane, and mercaptooctylphenyldimethoxysilane; mercaptoalkyldialkylalkoxysilanes such as mercaptopropyldimethylmethoxysilane, mercaptomethyldimethylmethoxysilane, mercaptopropyldiphenylmethoxysilane, and mercaptomethyldiphenylmethoxysilane; mercaptoarylalkoxysilanes such as 1-mercapto-4-trimethoxysilylbenzene, 1-mercapto-4-methyldimethoxysilylbenzene, 1-mercapto-4-dimethylmethoxysilylbenzene, 1-mercapto-4-triethoxysilylbenzene, 1-mercapto-4-methyldiethoxysilylbenzene, and 1-mercapto-4-dimethylethoxvsilylbenzene; and mercaptoarylenealkoxysilanes such as 1-mercaptoethyl-4-trimethoxysilylbenzene, 1-mercapto-4-trimethoxysilylethylbenzene, and 1-mercaptoethyl-4-trimethoxysilylethylbenzene.

A radical generator is used in the addition reaction between Unsaturated bond-containing polysiloxazane compound (8) and Mercapto group-containing silane compound (9).

Specific examples of the radical generator include organic peroxides such as tert-butylhydroperoxide, ditert-butylperoxide, and benzoyl peroxide, and azo compounds such as azobisisobutyronitrile and azobis-2-methylbutyronitrile, and azo compounds are particularly preferable.

The amount of the radical generator used is not particularly limited, and is preferably 0.0001 to 0.2 mol, more preferably 0.001 to 0.1 mol per mol of the unsaturated bond contained in Unsaturated bond-containing polysiloxazane compound (8) from the viewpoint of productivity.

The compounding ratio between Unsaturated bond-containing polysiloxazane compound (8) and Mercapto group-containing silane compound (9) is not particularly limited, and the amount of Mercapto group-containing silane compound (9) is preferably 0.1 to 1.5 mol, more preferably 0.2 to 1.2 mol, and still more preferably 0.3 to 1.0 mol per mol of the unsaturated bond contained in Unsaturated bond-containing polysiloxazane compound (8) from the viewpoint of the utility and the reactivity of the product.

The reaction temperature of the addition reaction is not particularly limited, and is preferably 0 to 200° C., more preferably 20 to 150° C. from the viewpoint of avoiding undesired side reactions.

The reaction time is also not particularly limited, and is preferably 1 to 40 hours, more preferably 1 to 20 hours from the viewpoint of avoiding undesired side reactions.

To prevent hydrolysis of the mercapto group-containing silane compound, the addition reaction is preferably performed under atmosphere of an inert gas such as nitrogen and argon.

Though the addition reaction proceeds without a solvent, a solvent can be used.

Specific examples of the solvent include a solvent of aliphatic hydrocarbons having 5 to 20 carbon atoms such as pentane, hexane, cyclohexane, heptane, octane, nonane, decane, isooctane, and isododecane, a solvent of aromatic hydrocarbons having 6 to 10 carbon atoms such as benzene, toluene, and xylene; a solvent of ethers such as diethyl ether, tetrahydrofuran, dioxane, and dipropylene glycol dimethyl ether; a solvent of esters such as ethyl acetate and butyl acetate; aprotic polar solvents such as acetonitrile, N,N-dimethylformamide, and N-methylpyrrolidone; and silicone solvents such as hexamethyldisiloxane, octamethyltrnsiloxane, decamethyltetrasiloxane, tris(trimethylsiloxy)methylsilane, octamethylcyclotetrasiloxane, and decamethylcyclopentasiloxane, and these solvents can be used alone or in combination of two or more. In particular, if an azo compound is used as a catalyst, toluene and xylene are preferable from the viewpoint of solubility of the catalyst.

There is next described a process for producing the polysiloxazane compound having an alkoxysilyl group of formula (1) by addition reaction of Hydrogen silane compound (13) or (14) to Unsaturated bond-containing polysiloxazane compound (8).

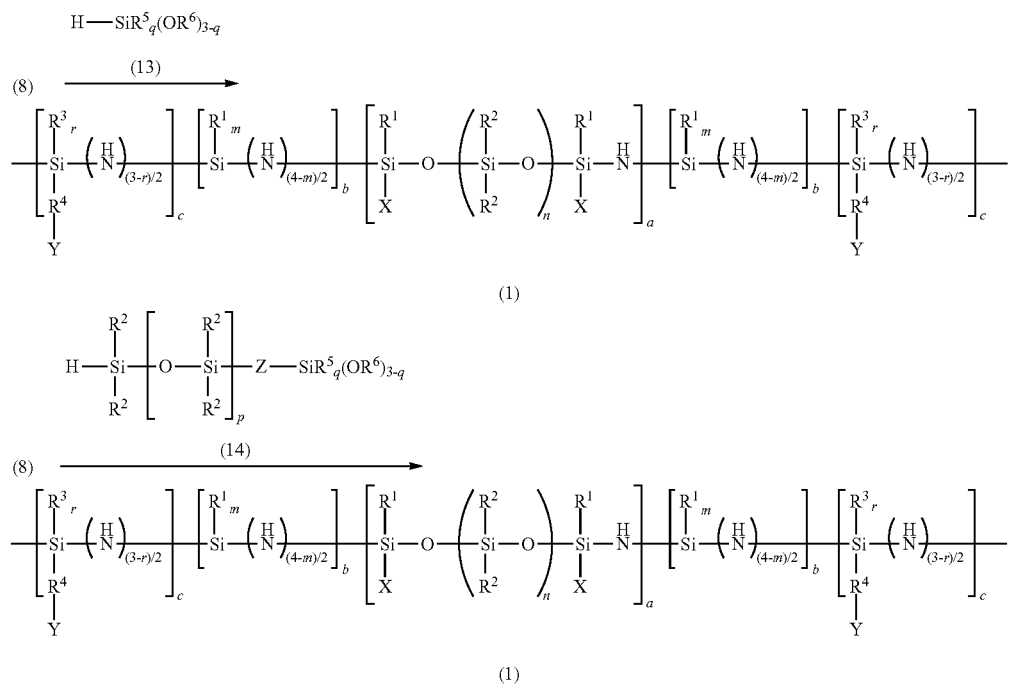

(1)

(1)

In these formulae, $R^1$ to $R^6$, a, b, c, n, p, q, r, X, Y, and Z represent a meaning same as above.

Specific examples of Hydrogen silane compound (13) include trialkoxysilane compounds such as trimethoxysilane, triethoxysilane, tripropoxysilane, triisopropoxysilane, and tributoxysilane; alkyldialkoxysilane compounds such as methyldimethoxysilane, methyldiethoxysilane, ethyldimethoxysilane, and phenyldimethoxysilane; and dialkylalkoxysilane compounds such as dimethylmethoxysilane, dimethylethoxysilane, and diphenylethoxysilane.

Specific examples of Hydrogen silane compound (14) when Z is a divalent hydrocarbon group include trialkoxysilylalkyl-siloxane compounds such as 1-trimethoxysilylethyl-1,1,3,3-tetramethyldisiloxane, 1-triethoxysilylethyl-1,1,3,3-tetramethyldisiloxane, 1-tripropoxysilylethyl-1,1,3,3-tetramethyldisiloxane, 1-triisopropoxysilylethyl-1,1,3,3-tetramethyldisiloxane, 1-trimethoxysilylhexyl-1,1,3,3-tetramethyldisiloxane, 1-triethoxysilylhexyl-1,1,3,3-tetramethyldisiloxane, 1-trimethoxysilyloctyl-1,1,3,3-tetramethyldisiloxane, 1-triethoxysilyloctyl-1,1,3,3-tetramethyldisiloxane, 1-trimethoxysilylethyl-1,1,3,3,5,5,7,7,9,9-decamethylpentasiloxane, 1-triethoxysilylethyl-1,1,3,3,5,5,7,7,9,9-decamethylpentasiloxane, 1-trimethoxysilylethyl-1,1,3,3,5,5,7,7,9,9,11,11,13,13,15,15-hexadecamethyloctasiloxane, and 1-triethoxvsilylethyl-1,1,3,3,5,5,7,7,9,9,11,11,13,13,15,15-hexadecamethloctasiloxane; and alkyldialkoxysilylalkyl-siloxane compounds such as 1-methyldimethoxysilylethyl-1,1,3,3-tetramethyldisiloxane, 1-methyldiethoxysilylethyl-1,1,3,3-tetramethyldisiloxane, 1-methyldimethoxysilyloctyl-1,1,3,3-tetramethyldisiloxane, 1-methyldiethoxysilyloctyl-1,1,3,3-tetramethyldisiloxane, 1-methyldimethoxysilylethyl-1,1,3,3,5,5,7,7,9,9-decamethylpentasiloxane, 1-methyldiethoxysilylethyl-1,1,3,3,5,5,7,7,9,9-decamethylpentasiloxane, 1-ethyldimethoxysilylethyl-1,1,3,3-tetramethyldisiloxane, 1-ethyldiethoxysilylethyl-1,1,3,3-tetramethyldisiloxane, 1-phenyldimethoxysilylethyl-1,1,3,3-tetramethyldisiloxane, and 1-phenyldiethoxysilylethyl-1,1,3,3-tetramethyldisiloxane; alkyldialkoxysilyl- alkyl-siloxane compounds such as 1-dimethylmethoxysilylethyl-1,1,3,3-tetramethyldisiloxane, 1-dimethylethoxysilylethyl-1,1,3,3-tetramethyldisiloxane, 1-dimethylmethoxysilyloctyl-1,1,3,3-tetramethyldisiloxane, 1-dimethylethoxysilyloctyl-1,1,33-tetramethyldisiloxane, 1-dimethylmethoxysilylethyl-1,1,3,3,5,5,7,7,9,9-decamethylpentasiloxane, 1-dimethylethoxysilylethyl-1,1,3,3,5,5,7,7,9,9-decamethylpentasiloxane, 1-diethylmethoxysilylethyl-1,1,3,3-tetramethyldisiloxane, 1-diethylethoxysilylethyl-1,1,3,3-tetramethyldisiloxane, 1-diphenylmethoxysilylethyl-1,1,3,3-tetramethyldisiloxane, and 1-diphenylethoxysilylethyl-1,1,3,3-tetramethyldisiloxane; and alkoxysilylfluoroalkyl-siloxane compounds such as 1-(3,3,4,4,5,5,6,6-octafluoro-8-trimethoxysilyl)octyl-1,1,3,3-tetramethyldisiloxane, 1-(3,3,4,4,5,5,6,6-octafluoro-8-triethoxysilyl)octyl-1,1,3,3-tetramethyldisiloxane, 1-(3,3,4,4,5,5,6,6,7,7,8,8-dodecafluoro-10-trimethoxysilyl)decyl-1,1,3,3-tetramethyldisiloxane, 1-(3,3,4,4,5,5,6,6,7,7,8,8-dodecafluoro-10-triethoxysilyl)decyl-1,1,3,3-tetramethyldisiloxane, 1-(3,3,4,4,5,5,6,6-octafluoro-8-methyldimethoxysilyl)octyl-1,1,3,3-tetramethyldisiloxane, and 1-(3,3,4,4,5,5,6,6-octafluoro-8-methyldiethoxysilyl)octyl-1,1,3,3-tetramethyldisiloxane.

Specific examples of Hydrogen silane compound (14) when Z is oxygen include trialkoxysiloxysiloxane compounds such as 1,1,1-trimethoxysiloxy-3,3,5,5,7,7,9,9-octamethylpentasiloxane, 1,1,1-trimethoxysiloxy-3,3,5,5,7,7,9,9,11,11,13,13,15,15-tetradecamethyloctasiloxane, 1,1,1-trimethoxysiloxy-3,3,5,5,7,7,9,9,11,11,13,13,15,15,17,17,19,19,21,21-icosamethylundecasiloxane, 1,1,1-triethoxysiloxy-3,3,5,7,7,9,9-octamethylpentasiloxane, 1,1,1-triethoxysiloxy-3,3,5,5,7,7,9,9,11,11,13,13,15,15-tetradecamethyloctasiloxane, and 1,1,1-triethoxysiloxy-3,3,5,5,7,7,9,9,11,11,13,13,15,15,17,17,19,19,21,21-icosamethylundecasiloxane; dialkoxysiloxysiloxane compounds such as 1,1-dimethoxysiloxy-1,3,3,5,5,7,7,9,9-nonamethylpentasiloxane, 1,1-dimethoxysiloxy-1-phenyl-3,3,5,5,7,7,9,9-octamethylpentasiloxane, 1,1-dimethoxysiloxy-1-vinyl-3,3,5,5,7,7,9,9-octamethylpentasiloxane, 1,1-diethoxvsiloxy-1,3, 3,5,5,7,7,9,9-nonamethylpentasiloxane, 1,1-diethoxysiloxy-1-phenyl-3,3,5,5,7,7,9,9-octamethylpentasiloxane, and 1,1-diethoxysiloxy-1-vinyl-3,3,5,5,7,7,9,9-octamethylpentasiloxane; and monoalkoxysiloxysiloxane compounds such as 1-methoxysiloxy-1,1,3,3,5,5,7,7,9,9-decamethylpentasiloxane, 1-methoxysiloxy-1-phenyl-1,3,3,5,5,7,7,9,9-nonamethylpentasiloxane, 1-methoxysiloxy-1-vinyl-1,3,3,5,5,7,7,9,9-nonamethylpentasiloxane, 1-ethoxysiloxy-1,1,3,3,5,5,7,7,9,9-decamethylpentasiloxane, 1-ethoxysiloxy-1-phenyl-1,3,3,5,5,7,7,9,9-nonamethylpentasiloxan, and 1-ethoxysiloxy-1-vinyl-1,3,3,5,5,7,7,9,9-nonamethylpentasiloxane.

The compounding ratio between Unsaturated bond-containing polysiloxazane compound (8) and Hydrogen silane compound (13) or (14) is not particularly limited, and the amount of Hydrogen silane compound (13) or (14) is preferably 0.1 to 1.5 mol, more preferably 0.2 to 1.2 mol, and still more preferably 0.3 to 1.0 mol per mol of the unsaturated bond contained in Unsaturated bond-containing polysiloxazane compound (8) from the viewpoint of the utility and the productivity of the reaction product.

A platinum compound is used as a catalyst in the addition reaction between Unsaturated bond-containing polysiloxazane compound (8) and Hydrogen silane compound (13) or (14).

Specific examples of the platinum compound include chloroplatinic acid, an alcohol solution of chloroplatinic acid, a toluene or xylene solution of platinum-1,3-divinyl-1,1,3,3-tetramethyldisiloxane complex, tetrakistriphenylphosphine platinum, dichlorobistriphenylphosphine platinum, dichlorobisacetonitrile platinum, dichlorobisbenzonitrile platinum, dichlorocyclooctadiene platinum, and platinum-activated carbon.

The amount of the platinum compound used is not particularly limited, and is preferably 0.000001 to 0.2 mol, more preferably 0.00001 to 0.1 mol per mol of the unsaturated bond contained in Unsaturated bond-containing polysiloxazane compound (8) from the viewpoint of productivity.

The reaction temperature of the addition reaction is not particularly limited, and is preferably 0 to 200° C., more preferably 20 to 150° C. from the viewpoint of product stability.

The reaction time is also not particularly limited, and is preferably 1 to 40 hours, more preferably 1 to 20 hours from the viewpoint of product stability.

To prevent deactivation of the catalyst and hydrolysis of the unsaturated bond-containing polysiloxazane compound and the hydrogen silane compound, the reaction is preferably performed under atmosphere of an inert gas such as nitrogen and argon.

Though the addition reaction proceeds without a solvent, a solvent can be used.

Specific examples of the solvent include the same solvents as those used in the reaction with Mercapto group-containing silane compound (9).

A process for producing Polysiloxazane compound (1) in which Unsaturated bond-containing polysiloxazane compound (12) is used as a starting material is next described.

Unsaturated bond-containing polysiloxazane compound (12) can be obtained by, for example, mixing Silicone oil modified with OH at both ends (4) and the unsaturated bond-containing chlorosilane compound of formula (10) (hereinafter, referred to as Unsaturated bond-containing chlorosilane compound (10)), to perform dehydrochlorination condensation to obtain a chlorosiloxane compound of formula (11) (hereinafter, referred to as Chlorosiloxane compound (11)), and then introducing ammonia.

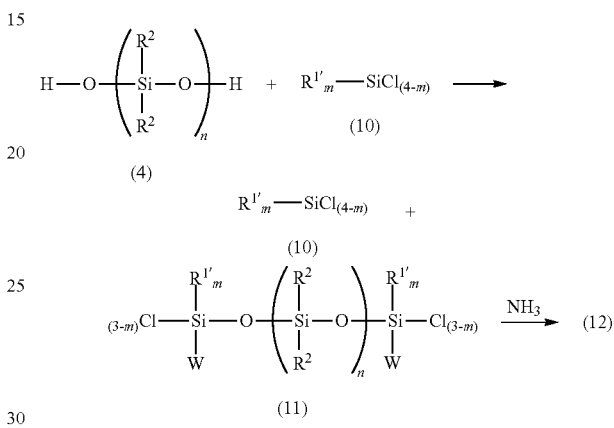

In formulas (10) and (11), $R^{1'}$ represents a meaning same as that of $R^1$ or $R^3$ except that $R^{1'}$ necessarily contains an unsaturated bond. Though the position of the introduced unsaturated group can be at the terminal or inside of the chain hydrocarbon group, $R^{1'}$ preferably has an unsaturated bond at terminal from the viewpoint of the reactivity in introduction of an alkoxy group described later.

The mixing ratio between Silicone oil modified with OH at both ends (4) and Chlorosilane compound (10) is not particularly limited, and the amount of Chlorosilane compound (10) is preferably 5 to 30 mol, more preferably 5 to 20 mol, and still more preferably 7 to 15 mol per mol of the amount of substance of the OH groups in Silicone oil modified with OH at both ends (4) from the viewpoint of imparting water droplet-sliding property.

The conditions for introducing ammonia to Chlorosiloxane compound (11) and a surplus of Chlorosilane compound (10) to perform ammonolysis polymerization are the same as in the process for producing Unsaturated bond-containing polysiloxazane compound (8).

As a process for producing Polysiloxazane compound (1) from Unsaturated bond-containing polysiloxazane compound (12) thus obtained, there are two processes as in the case of using Unsaturated bond-containing polysiloxazane compound (8) as a starting raw material: a process in which addition reaction of Mercapto group-containing silane compound (9) is performed in presence of a radical generator and a process in which addition reaction of Hydrogen silane compound (13) or (14) is performed.

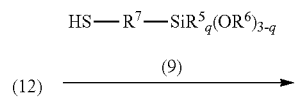

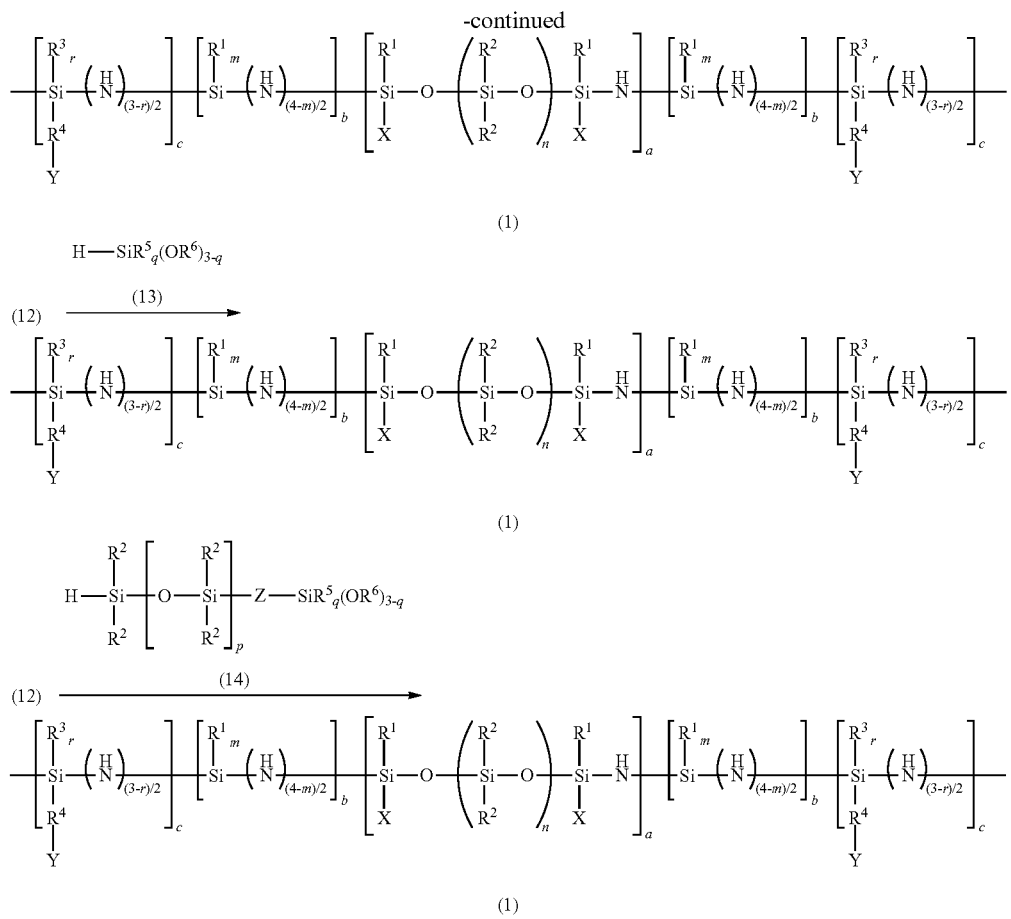

In these formulae, $R^1$ to $R^7$, a, b, c, n, p, q, r, X, Y, and Z represent a meaning same as above.

Also in this case, for the same reason as in the case of using Unsaturated bond-containing polysiloxazane compound (8) as a starting raw material, if $R^{1'}$ in Unsaturated bond-containing polysiloxazane compound (12) contains a sulfur atom, addition reaction in which Mercapto group-containing silane compound (9) is used is preferably selected, and if $R^{1'}$ is free of a sulfur atom, any of the process of adding the mercapto group-containing silane compound of formula (9) and the process of adding the hydrogen silane compound of formula (13) or (14) can be used.

In this case, the addition reaction between Unsaturated bond-containing polysiloxazane compound (12) and Mercapto group-containing silane compound (9) can be performed in the same manner as in the addition reaction between Unsaturated bond-containing polysiloxazane compound (8) and Mercapto group-containing silane compound (9).

The addition reaction between Unsaturated bond-containing polysiloxazane compound (12) and Hydrogen silane compound (13) or (14) can be performed in the same manner as in the addition reaction between Unsaturated bond-containing polysiloxazane compound (8) and Hydrogen silane compound (13) or (14).

[Composition and Cured Product]

The composition including Polysiloxazane compound (1) thus obtained and a solvent is next described.

Examples of the solvent included in the composition include the same solvents as those used in the process for producing Polysiloxazane compound (1) described above, and from the viewpoint of workability and safety, aliphatic hydrocarbon compounds having 8 to 14 carbon atoms, silicone compounds having 2 to 5 silicon atoms, diethylene glycol dialkyl ether, triethylene glycol dialkyl ether, dipropylene glycol dialkyl ether and the like are preferable, and among them, a mixture of isoparaffin compounds having a boiling point of 100 to 220° C., hexamethyldisiloxane, octamethyltrisiloxane, decamethyltetrasiloxane, tris(trimethylsiloxy)methylsilane, dipropylene glycol dimethyl ether are more preferable.

The composition can include at least one metal compound selected from a titanium compound, an aluminum compound, a zinc compound, and a tin compounds as a curing catalyst.

Examples of the metal compound include tetraalkyl orthotitanates such as tetrabutyl orthotitanate, tetramethyl orthotitanate, tetraethyl orthotitanate, tetrapropyl orthotitanate, tetraisopropyl orthotitanate, and partial hydrolysis condensates thereof; titanium compounds such as titanium acylate; aluminum compounds such as aluminum trihydroxide, aluminum alcoholate, aluminum acylate, aluminum acylate salts, aluminosyloxy compounds, and aluminum metal chelate compounds; tin compounds such as dioctyltin dioctate and dioctyltin dilaurate; and zinc compounds such as zinc octylate and zinc 2-ethylhexanoate.

The amount of the metal compound used is not particularly limited, and is preferably 0.01 to 10% by weight, more preferably 0.1 to 5% by weight from the viewpoint of sufficiently obtaining the effect of the catalyst.

Further, the composition can include an organoxysilane compound of formula (16) below (hereinafter, referred to as Organoxysilane compound (16)).

In this formula, $R^5$ and $R^6$ represent a meaning same as above, and d and e are each independently 0, 1, or 2.

In formula (16) above, $R^9$ is a substituted or unsubstituted divalent hydrocarbon group having 1 to 50 carbon atoms, preferably having 2 to 30 carbon atoms, more preferably having 2 to 8 carbon atoms that optionally contains one or more heteroatoms such as O, S, N, and Si. Specific examples of such a divalent hydrocarbon group include the same groups as those of $R^4$.

$R^9$ can contain one or more heteroatoms such as O, S, N, and Si, and two or more these heteroatoms can together form a ring such as a cyclic siloxane.

Specific examples of the divalent hydrocarbon group having such heteroatoms include an alkyleneoxyalkylene, an alkylenethioalkylene, an alkyleneaminoalkylene, an alkylenesilylalkylene, and an alkylenesiloxysilylalkylene group, and examples of these alkylene groups each independently include the same groups as those exemplified in the linear, branched, and cyclic alkylene groups. The cyclic alkylene group can contain a heteroatom in the ring structure, and specific examples thereof include furan, pyrrole, pyrrolidine, piperidine, piperazine, triazine, and isocyanurate.

Further, $R^9$ can have a substituted or unsubstituted monovalent hydrocarbon group having 1 to 20 carbon atoms that optionally contains an alkoxysilyl group on such heteroatoms. Examples of the monovalent hydrocarbon group include the same groups as those exemplified in $R^5$ and $R^6$ above.

Specific examples of the substituted or unsubstituted monovalent hydrocarbon group having 1 to 20 carbon atoms that contains an alkoxysilyl group include: a (trimethoxysilyl)methyl, a (trimethoxysilyl)ethyl, a (trimethoxysilyl)propyl, a (dimethoxymethylsilyl)methyl, a (dimethoxymethylsilyl)ethyl, a (dimethoxymethylsilyl)propyl, a (dimethylmethoxysilyl)methyl, a (dimethylmethoxysilyl) ethyl, a (dimethylmethoxysilyl)propyl, a (triethoxysilyl)methyl, a (triethoxysilyl)ethyl, a (triethoxysilyl)propyl, a (diethoxymethylsilyl)methyl, a (diethoxymethylsilyl)ethyl, a (diethoxymethylsilyl)propyl, a (dimethylethoxysilyl) methyl, a (dimethylethoxysilyl)ethyl group, and a (dimethylethoxysilyl)propyl group.

More specific examples of the divalent hydrocarbon group that optionally contains a heteroatom include, but are not limited to, —(CH$_2$)$_3$—O—(CH$_2$)—, —(CH$_2$)$_3$—S—(CH$_2$)$_3$—, —(CH$_2$)$_3$—NH—(CH$_2$)$_3$—, —(CH$_2$)$_2$—Si (CH$_3$)$_2$—(CH$_2$)$_2$—, —(CH$_2$)$_2$—Si(CH$_3$)$_2$OSi(CH$_3$)$_2$—(CH$_2$)$_2$—, and groups of formulas below:

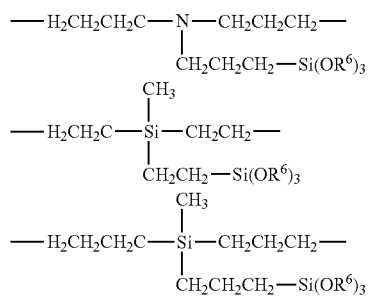

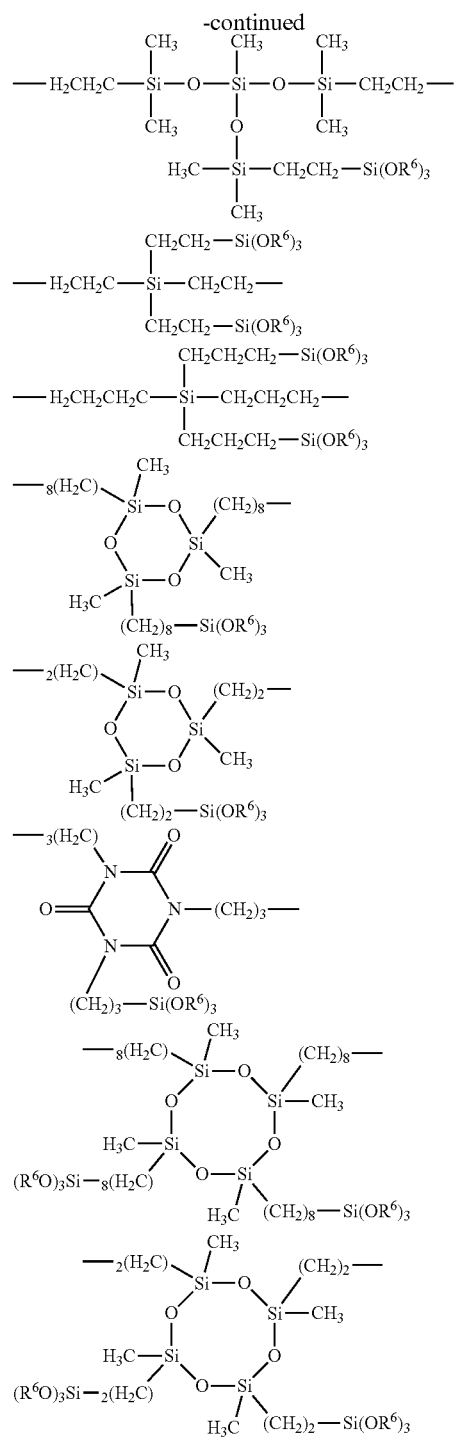

Further, in the divalent hydrocarbon group of $R^9$, a part or all of the hydrogen atoms can be substituted with a fluorine atom. Specific examples of the divalent hydrocarbon group substituted with a fluorine atom include the same groups as those of $R^4$.

Specific examples of Organoxysilane compound (16) include bisalkoxysilyl compounds such as 1,2-bis (trimethoxysilyl)ethane, 1,2-bis(methyldimethoxysilyl)ethane, 1,2-bis(dimethylmethoxysilyl)ethane, 1-(trimethoxysilyl)-2-(methyldimethoxysilyl)ethane, 1-(trimethoxysilyl)-2-(dimethylmethoxysilyl)ethane, 1,6-bis(trimethoxysilyl)

hexane, 1,6-bis(triethoxysilyl)hexane, 1,8-bis(trimethoxysilyl)octane, 1,8-bis(triethoxysilyl)octane, bis(trimethoxysilylpropyl)ether, bis(triethoxysilylpropyl)ether, bis(trimethoxysilylpropyl) sulfide, bis(triethoxysilylpropyl) sulfide, bis(trimethoxysilylpropyl) amine, bis(triethoxysilylpropyl)amine, bis(trimethoxysilylpropyl)piperazine, bis(triethoxysilylpropyl)piperazine, bis(trimethoxysilylethyl)dimethylsilane, bis(triethoxysilylethyl)dimethylsilane, 1,3-bis(trimethoxysilyl)-1,1,3,3-tetramethyldisiloxane, 1,7-bis(trimethoxysilyl)-1,1,3,3,5,5,7,7-octamethyltetrasiloxane, 1,3-bis(trimethoxysilylethyl)-1,1,3,3-tetramethyldisiloxane, 1,3-bis(triethoxysilylethyl)-1,1,3,3-tetramethyldisiloxane, 1,9-bis(trimethoxysilylethyl)-1,1,3,3,5,5,7,7,9,9-decamethylpentasiloxane, 1,4-bis(trimethoxysiloxydimethylsilyl)benzene, and 1,4-bis(trimethoxysilylethyldimethylsilyl)benzene; trisalkoxysilyl compounds such as tris(trimethoxysilylpropyl)amine, tris(triethoxysilylpropyl)amine, tris(trimethoxysilylethyl)methylsilane, tris(triethoxysilylethyl)methylsilane, tris(trimethoxysilylpropyl)methylsilane, tris(triethoxysilylpropyl)methylsilane, tris(trimethoxysilylethyldimethylsiloxy)methylsilane, tris(triethoxysilylethyldimethylsiloxy)methylsilane, 1,3,5-tris(trimethoxysilylethyl)-1,3,5-trimethylcyclotrisiloxane, 1,3,5-tris(trimethoxysilyloctyl)-1,3,5-trimethylcyclotrisiloxane, and N,N,N-tris(trimethoxysilylpropyl)isocyanurate; and tetrakisalkoxysilyl compounds such as tetrakis(trimethoxysilylethyl)silane, tetrakis(triethoxysilylethyl)silane, tetrakis(trimethoxysilylpropyl)silane, tetrakis(triethoxysilylpropyl)silane, 1,3,5,7-tetrakis(trimethoxysilylethyl)-1,3,5,7-tetramethylcyclotetrasiloxane, and 1,3,5,7-tetrakis(trimethoxysilyloctyl)-1,3,5,7-tetramethylcyclotetrasiloxane.

Specific examples of the compound in which a part or all of the divalent hydrocarbon groups of $R^9$ are substituted with fluorine include bisalkoxysilylfluoroalkane compounds such as 1,6-bis(trimethoxysilyl)-3,3,4,4-tetrafluorohexane, 1,6-bis(triethoxysilyl)-3,3,4,4-tetrafluorohexane, 1,8-bis(trimethoxysilyl)-3,3,4,4,5,5,6,6-octafluorooctane, and 1,8-bis(triethoxysilyl)-3,3,4,4,5,5,6,6-octafluorooctane.

If $R^9$ in formula (16) above is an alkyleneaminoalkylene group, it is preferably the organoxysilane compound of formula (17) below (hereinafter, referred to as Organoxysilane compound (17)) in which the corresponding amino group or an alcohol substituted with an amino group, and the organooxysilyl group in the Organoxysilane compound of formula (16) form a ring structure.

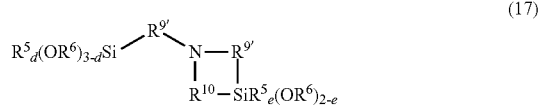
(17)

In this formula, $R^5$, $R^6$, d, and e represent a meaning same as above, and $R^{9'}$ represents a meaning same as that of $R^9$.

In formula (17), $R^{10}$ represents a single bond or a divalent hydrocarbon group having 2 to 10 carbon atoms in which the terminal group on the Si atom side is substituted with —O—, —S—, —NH—, or —C(=O)O—, and is preferably a single bond from the viewpoint of reactivity.

Examples of such a divalent hydrocarbon group having 2 to 10 carbon atoms include the same groups as those exemplified in $R^4$.

Specific examples of Organoxysilane compound (17) include 2,2-dimethoxy-1-(3-trimethoxysilylpropyl)-1-aza-2-silacyclopentane, 2,2-dimethoxy-6-(3-trimethoxysilylpropyl)-6-aza-1-silacyclooctane, and 2,2-dimethoxy-6-(3-trimethoxysilylpropyl)-8-methyl-6-aza-1-silacyclooctane.

The content of Organoxysilane compound (16) or (17) is not particularly limited, and is preferably 1 to 50% by weight, more preferably 1 to 30% by weight in Polysiloxazane compound (1).

The composition can contain one or more other additives selected from a pigment, an antifoaming agent, a lubricant, a preservative, a pH adjuster, a film forming agent, an antistatic agent, an antibacterial agent, a dye and the like as long as the effect thereof is not impaired.

The composition usually reacts with moisture in the air, and is cured to give a cured product.

For curing, the solvent can be volatilized in advance or do not need to be volatilized, or the composition can be cured while volatilizing the solvent.

The temperature during curing can be from room temperature to temperature under a heating condition. The temperature at this time is not particularly limited as long as it does not adversely affect the substrate, and it is usually 0 to 200° C., preferably 0 to 100° C., more preferably 25 to 50° C. to maintain reactivity.

Coating can be formed by covering the surface of the object on which a coating is formed with the composition, and then reacting the composition with moisture in the air to cure the composition.

The object on which a coating is formed can be an inorganic material or an organic material.

Examples of the inorganic material include metal, glass, silica, alumina, talc, calcium carbonate, and carbon.

As the glass, commonly used types of glass such as E glass, C glass, and quartz glass can be used, and glass fiber can also be used.

The glass fiber can be an aggregate thereof, and can be, for example, a bundle of glass (filament) fibers having a fiber diameter of 3 to 30 μm, a twine, a fabric and the like.

Examples of the organic material include resin materials such as polyethylene, polypropylene, polystyrene, poly(meth)acryl, polyvinyl chloride, polycarbonate, nylon, polyurethane, polybutylene terephthalate, polyethylene terephthalate, ABS (polymer of acrylonitrile, butadiene, and styrene), melamine, phenol, epoxy, and polyimide; and elastomer and rubber materials such as polybutadiene rubber, polyisopropylene rubber, nitrile rubber, neoprene rubber, polysulfide, and urethane rubber.

The shape of the object on which a coating is formed is not particularly limited, and can be a plate shape, a sheet shape, a fiber shape, or a powder shape.

Examples of the method for covering the object on which a coating is formed include known coating methods such as brush application method, sponge application method, cloth application method, spray coating method, wire bar method, blade method, roll coating method, dipping method, and spin coating method.

For powder materials such as silica, alumina, talc, and calcium carbonate, a mixing method can be employed in which the composition is mixed directly using a mixer or a mill together with the object on which a coating is formed.

The cured coating of the composition thus obtained exhibits excellent water-repellent property and water droplet-sliding property.

EXAMPLES

Hereinafter, though the present invention is more specifically described by way of Examples and Comparative Examples, the present invention is not limited to Examples below.

Example 1-1

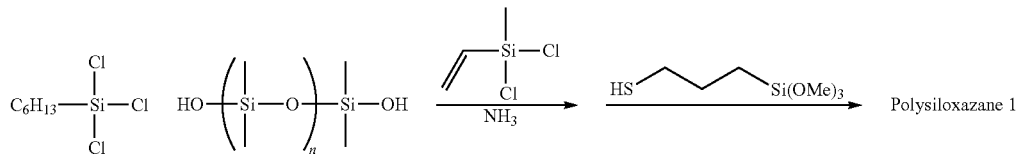

(wherein Me represents a methyl group. The same applies hereinafter.)

The inside of a four-neck glass flask equipped with a stirrer, a gas feed tube, a thermometer, and a reflux condenser was replaced with nitrogen. While passing nitrogen gas through the open end at the top of the reflux condenser to prevent outside air from entering, 65.9 g (0.300 mol) of hexyltrichlorosilane, 45.0 g of silicone oil modified with silanol at both ends having a kinematic viscosity at 25° C. of 60 mm²/s, and 295.6 g of cyclopentyl methyl ether (hereinafter, referred to as "CPME") as a solvent were placed and stirred for 1 hour at room temperature. To this, 42.3 g (0.300 mol) of methylvinyldichlorosilane and 76.8 g of CPME were added and the mixture was stirred to obtain a uniform reaction liquid. The reaction liquid was cooled to 10° C. or less, and ammonia gas was fed into the reaction liquid through a feed tube. The ammonia feeding was continued for 6 hours while cooling the reaction liquid so that the temperature of the reaction liquid would not exceed 30° C. Then, the ammonia feeding was stopped, and nitrogen gas was flowed in through the feed tube for 2 hours to purge surplus ammonia gas. To this reaction liquid, 131.5 g of a 48% by weight aqueous sodium hydroxide was slowly added, 270.6 g of water was further added, and the mixture was stirred at room temperature for 1 hour. Then, the resulting product was allowed to stand to remove the lower layer. The upper layer was concentrated at 100° C./18 kPa, and then further concentrated at 120° C./4 kPa. Then, 110.9 g of toluene was added to 110.9 g of the obtained concentrate, and the mixture was filtered through a 1 μm membrane filter to obtain 219.6 g of a colorless transparent solution.

Subsequently, the inside of a four-neck glass flask equipped with a stirrer, a thermometer, a reflux condenser, and a dropping funnel was replaced with nitrogen, 16.9 g (0.086 mol) of mercaptopropyltrimethoxysilane and 16.9 g of toluene were placed, and heated to 90° C. A mixture of 80.0 g of the colorless transparent solution obtained above and 0.168 g (0.000874 mol) of 2,2'-azobis(2-methylbutyronitrile) were added from the dropping funnel over 2.5 hours, and the mixture was stirred for 1 hour while maintaining the same temperature to obtain Polysiloxazane 1.

To the obtained Polysiloxazane 1, 60.0 g of an isoparaffin solvent (IP solvent 1620, manufactured by Idemitsu Kosan Co., Ltd., the same applies hereinafter) was added, and the mixture was concentrated at 100° C./15 kPa, and then further concentrated at 100° C./4 kPa. The non-volatile matter of the obtained reaction liquid was measured with an infrared moisture meter (FD-720, manufactured by Kett Electric Laboratory) under conditions of 105° C./3 hours, and found to be 53.8%. To this reaction liquid, 7.5 g of the isoparaffin solvent was added to adjust the non-volatile matter to 50%, thereby Composition 1 was obtained.

Figure 2:
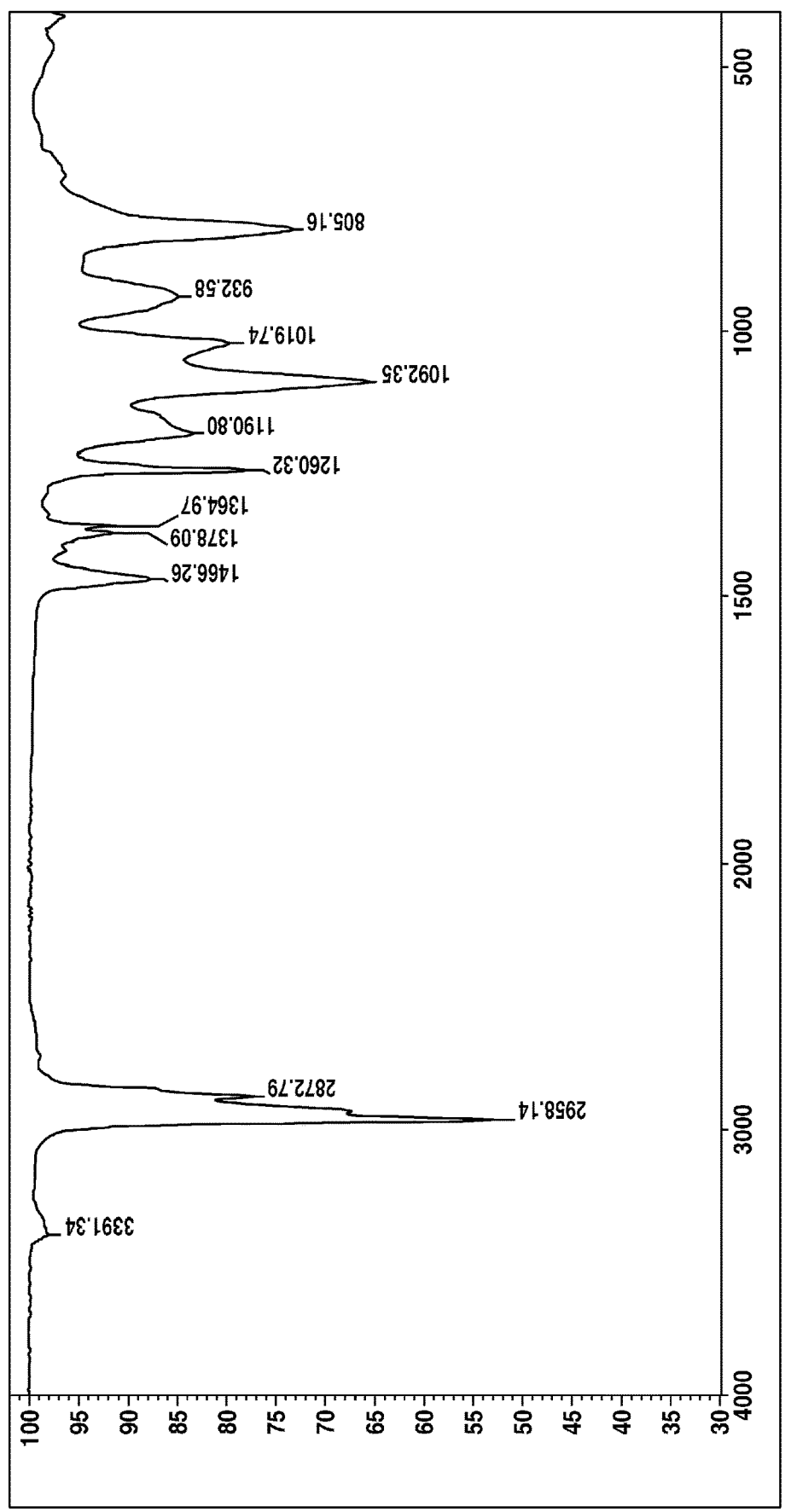
FIG. 2 is an IR spectrum of the polysiloxazane compound obtained in Example 1-1.

The obtained Composition 1 was subjected to IR analysis. Peaks at 932 cm$^{-1}$ and 1,190 cm$^{-1}$ derived from Si—N—Si structure, a peak at 1,092 cm$^{-1}$ derived from Si—O—Si, and a peak at 3,391 cm$^{-1}$ derived from NH were observed. Under the following conditions, GPC analysis was performed, and the weight average molecular weight was found to be 5,300, which supported the production of the target Polysiloxazane 1. The $^1$H-NMR spectrum is shown in FIG. 1, and the IR spectrum is shown in FIG. 2.

(GPC Conditions)
Instrument: HLC-8420GPC EcoSEC Elite-WS (manufactured by Tosoh Corporation)
Column: GPC KF-G 4A (manufactured by Shodex)
GPC KF-404 HQ (manufactured by Shodex)
GPC KF-402.5 HQ (manufactured by Shodex)
Eluant: tetrahydrofuran (THF)
Flow rate: 0.35 ml/min
Detector: RI
Column thermostat temperature: 40° C.
Reference material: polystyrene

Example 1-2

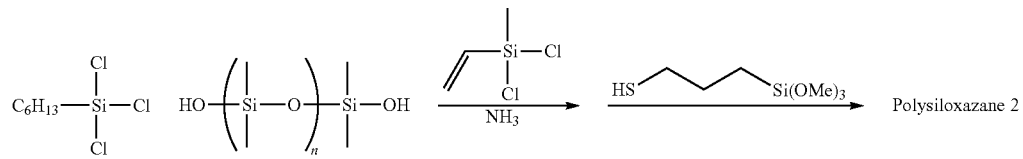

The inside of a four-neck glass flask equipped with a stirrer, a gas feed tube, a thermometer, and a reflux condenser was replaced with nitrogen. While passing nitrogen gas through the open end at the top of the reflux condenser to prevent outside air from entering, 22.0 g (0.100 mol) of hexyltrichlorosilane, 15.0 g of silicone oil modified with silanol at both ends having a kinematic viscosity at 25° C. of 700 mm²/s, and 126.3 g of CPME as a solvent were placed and stirred for 1 hour at room temperature. To this, 14.1 g (0.100 mol) of methylvinyldichlorosilane was added, and the mixture was stirred to obtain a uniform reaction liquid. The reaction liquid was cooled to 10° C. or less, and ammonia gas was fed into the reaction liquid through a feed tube. The ammonia feeding was continued for 4.5 hours while cooling the reaction liquid so that the temperature of the reaction liquid would not exceed 30° C. Then, the ammonia feeding was stopped, and nitrogen gas was flowed in through the feed tube for 2 hours to purge surplus ammonia gas. To this reaction liquid, 44.0 g of a 48% by weight aqueous sodium hydroxide was slowly added, 88.0 g of water was further added, and the mixture was stirred at room temperature for 1 hour. Then, the resulting product was allowed to stand to remove the lower layer. The upper layer was concentrated at 100° C./18 kPa, and then further concentrated at 120° C./4 kPa. Then, 36.0 g of toluene was added to 35.9 g of the obtained concentrate, and the mixture was filtered through a 1 μm membrane filter to obtain 71.0 g of a colorless transparent solution.

Subsequently, the inside of a four-neck glass flask equipped with a stirrer, a thermometer, a reflux condenser, and a dropping funnel was replaced with nitrogen, 4.1 g (0.021 mol) of mercaptopropyltrimethoxysilane and 4.1 g of toluene were placed, and heated to 90° C. A mixture of 20.0 g of the colorless transparent solution obtained above and 0.047 g (0.00024 mol) of 2,2'-azobis(2-methylbutyronitrile) were added from the dropping funnel over 2.5 hours, and the mixture was stirred for 2 hours while maintaining the same temperature to obtain Polysiloxazane 2.

The obtained Polysiloxazane 2 was concentrated at 100° C./1 kPa to obtain 12.6 g of a reaction product. To this, 29.4 g of the isoparaffin solvent was added to adjust the non-volatile matter to 30%, thereby Composition 2 was obtained.

Figure 3:
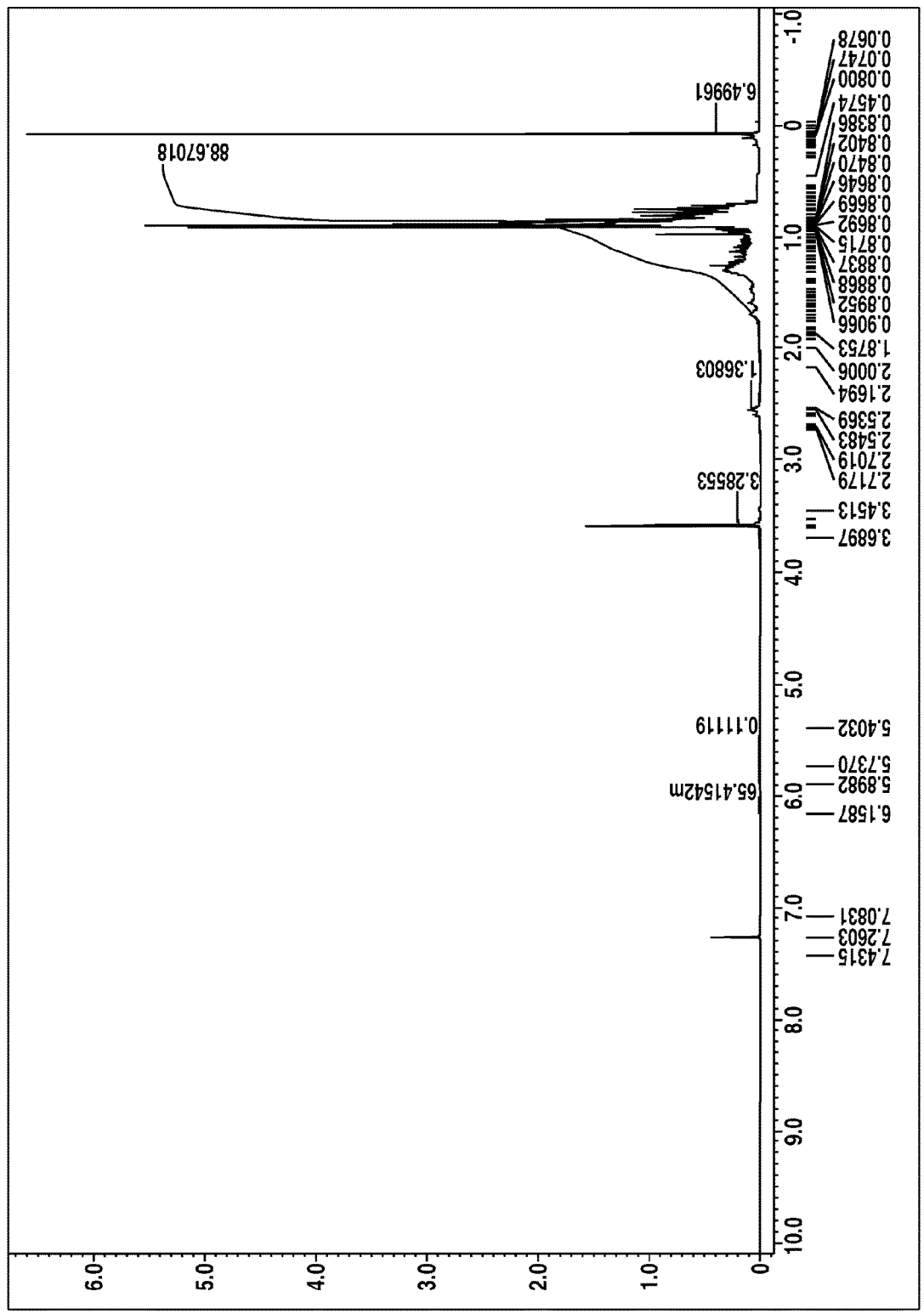
FIG. 3 is a $^1$H-NMR spectrum of the polysiloxazane compound obtained in Example 1-2.
Figure 4:
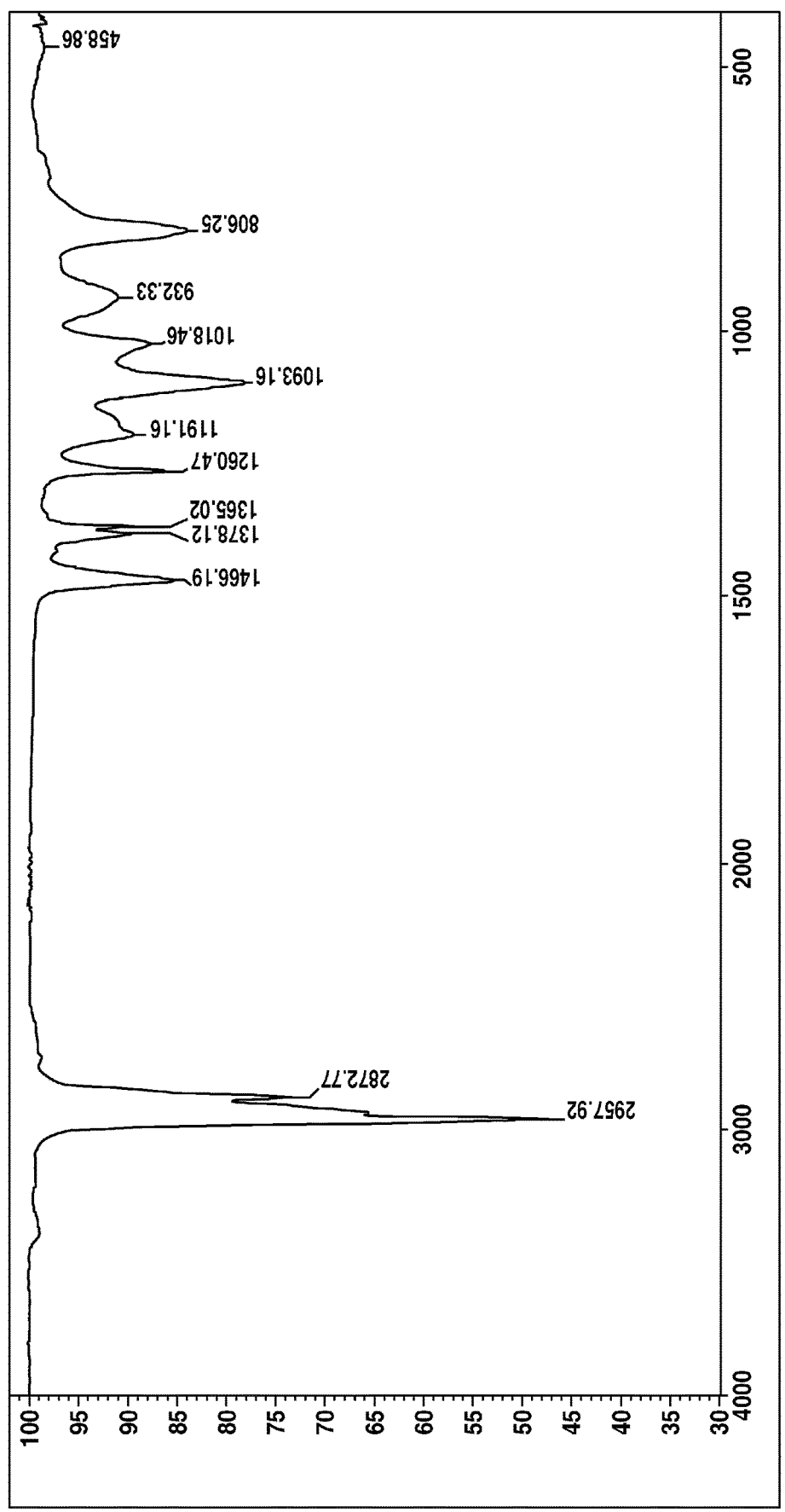
FIG. 4 is an IR spectrum of the polysiloxazane compound obtained in Example 1-2.

The obtained Composition 2 was subjected to IR analysis. Peaks at 932 cm$^{-1}$ and 1,191 cm$^{-1}$ derived from Si—N—Si structure, a peak at 1,093 cm$^{-1}$ derived from Si—O—Si, and a peak at 3,390 cm$^{-1}$ derived from NH were observed. GPC analysis was performed, and the weight average molecular weight was found to be 4,200, which supported the production of the target Polysiloxazane 2. The $^1$H-NMR spectrum is shown in FIG. 3, and the IR spectrum is shown in FIG. 4.

Example 1-3 and stirred for 1 hour at room temperature. To this, 14.1 g (0.100 mol) of methylvinyldichlorosilane was added, and the mixture was stirred to obtain a uniform reaction liquid. The reaction liquid was cooled to 10° C. or less, and ammonia gas was fed into the reaction liquid through a feed tube. The ammonia feeding was continued for 6 hours while cooling the reaction liquid so that the temperature of the reaction liquid would not exceed 30° C. Then, the ammonia feeding was stopped, and nitrogen gas was flowed in through the feed tube for 2 hours to purge surplus ammonia gas. To this reaction liquid, 44.0 g of a 48% by weight aqueous sodium hydroxide was slowly added, 88.0 g of water was further added, and the mixture was stirred at room temperature for 1 hour. Then, the resulting product was allowed to stand to remove the lower layer. The upper layer was concentrated at 100° C./16 kPa, and then further concentrated at 120° C./4 kPa. Then, 36.4 g of toluene was added to 36.4 g of the obtained concentrate, and the mixture was filtered through a 1 μm membrane filter to obtain 71.4 g of a colorless transparent solution.

Subsequently, the inside of a four-neck glass flask equipped with a stirrer, a thermometer, a reflux condenser, and a dropping funnel was replaced with nitrogen, 4.2 g (0.021 mol) of mercaptopropyltrimethoxysilane and 4.4 g of toluene were placed, and heated to 90° C. A mixture of 20.0 g of the colorless transparent solution obtained above and 0.0497 g (0.000259 mol) of 2,2'-azobis(2-methylbutyronitrile) were added from the dropping funnel over 1 hour, and the mixture was stirred for 2 hours while maintaining the same temperature to obtain Polysiloxazane 3.

The obtained Polysiloxazane 3 was concentrated at 120° C./1 kPa to obtain 13.3 g of a reaction product. The isoparaffin solvent (31.0 g) was added to adjust the non-volatile matter to 30%, thereby Composition 3 was obtained.

Figure 5:
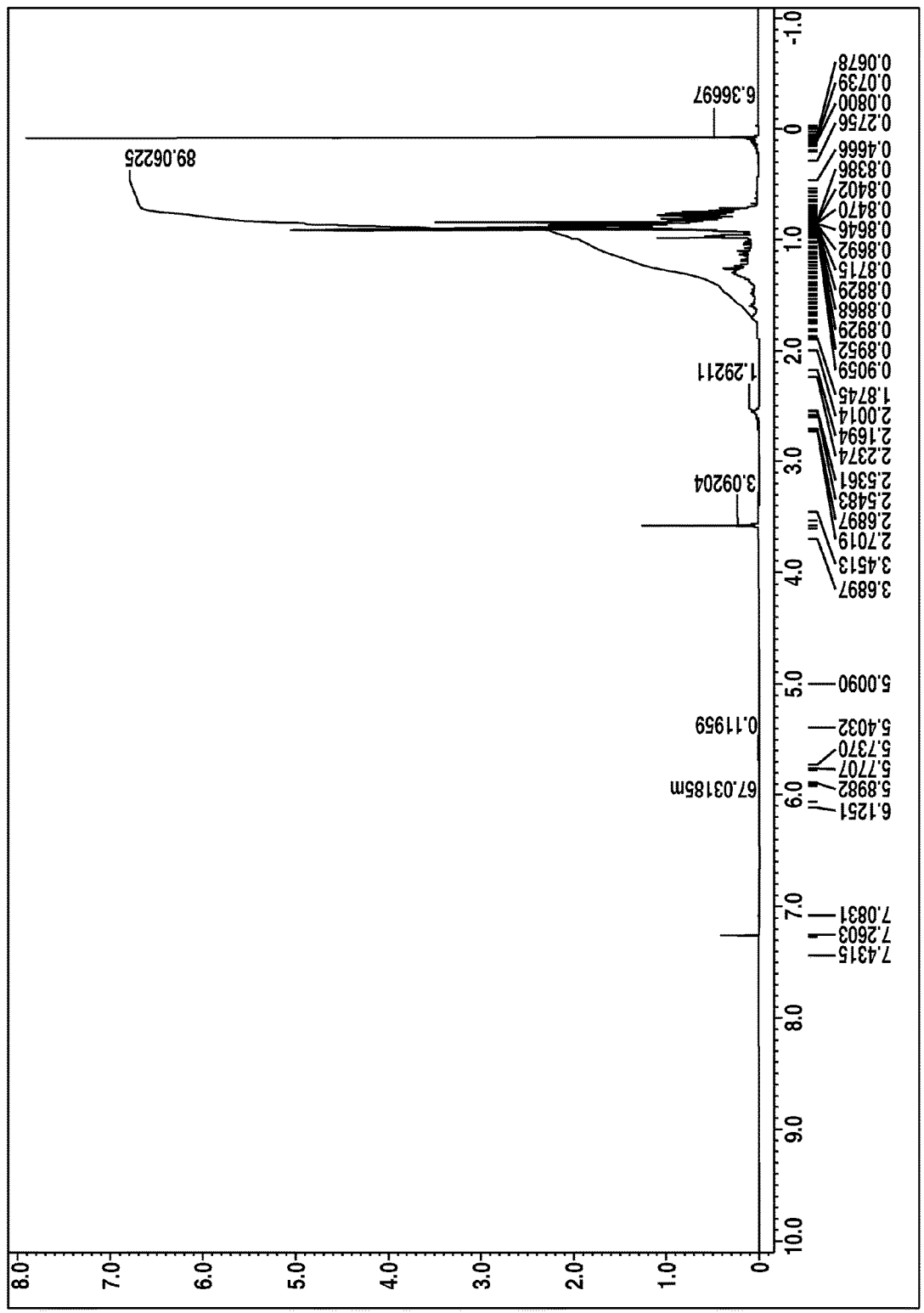
FIG. 5 is a $^1$H-NMR spectrum of the polysiloxazane compound obtained in Example 1-3.
Figure 6:
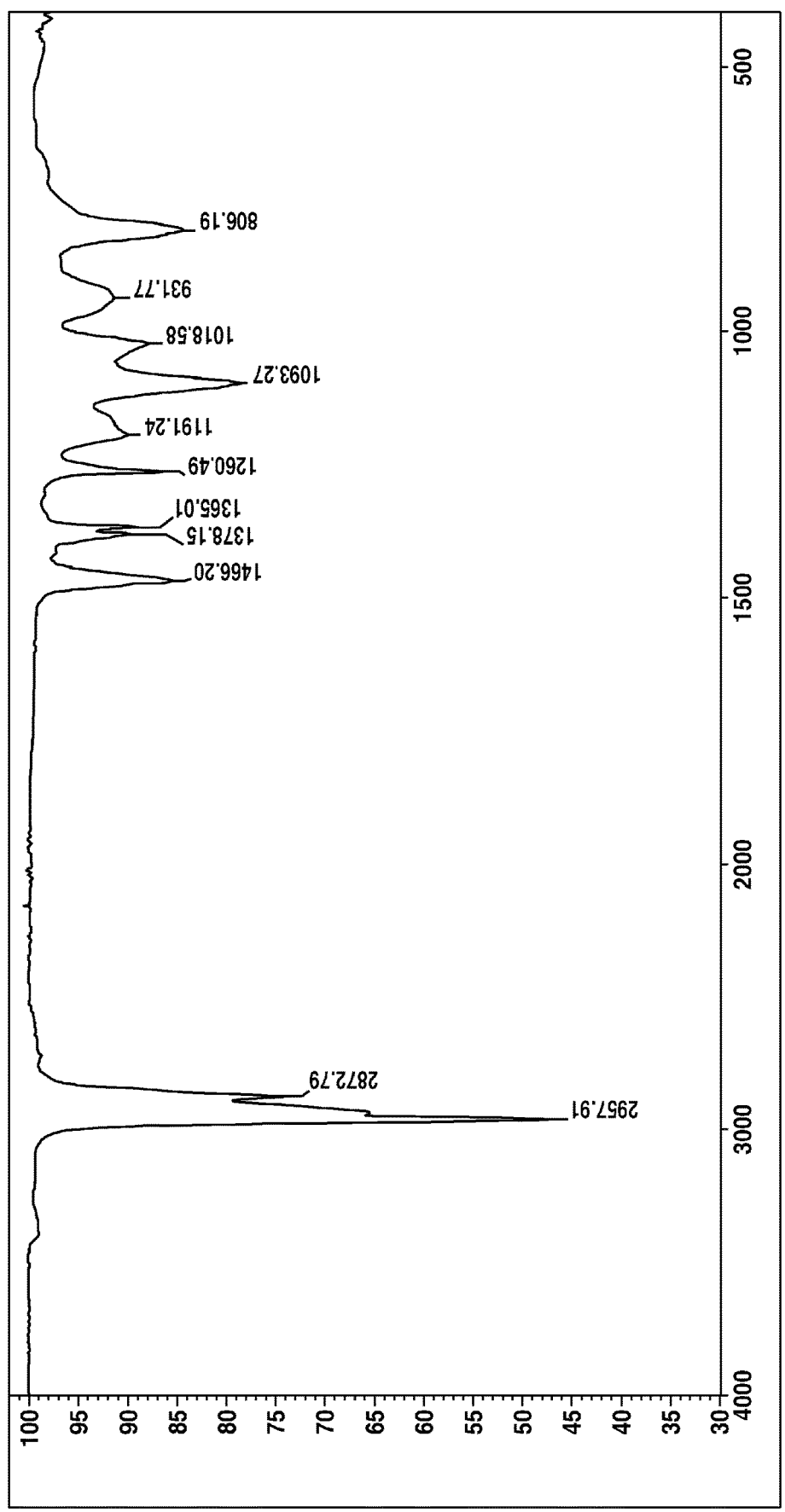
FIG. 6 is an IR spectrum of the polysiloxazane compound obtained in Example 1-3.

The obtained Composition 3 was subjected to IR analysis. Peaks at 931 cm$^{-1}$ and 1,191 cm$^{-1}$ derived from Si—N—Si structure, a peak at 1,093 cm$^{-1}$ derived from Si—O—Si, and a peak at 3385 cm derived from NH were observed. GPC analysis was performed, and the weight average molecular weight was found to be 4,300, which supported the production of the target Polysiloxazane 3. The $^1$H-NMR spectrum is shown in FIG. 5, and the IR spectrum is shown in FIG. 6.

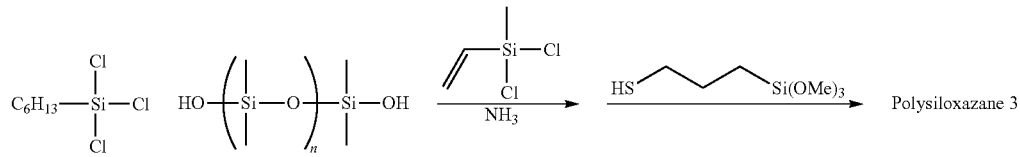

The inside of a four-neck glass flask equipped with a stirrer, a gas feed tube, a thermometer, and a reflux condenser was replaced with nitrogen. While passing nitrogen gas through the open end at the top of the reflux condenser to prevent outside air from entering, 22.1 g (0.101 mol) of hexyltrichlorosilane, 15.0 g of silicone oil modified with silanol at both ends having a kinematic viscosity at 25° C. of 1500 mm$^2$/s, and 130 g of CPME as a solvent were placed Example 1-4

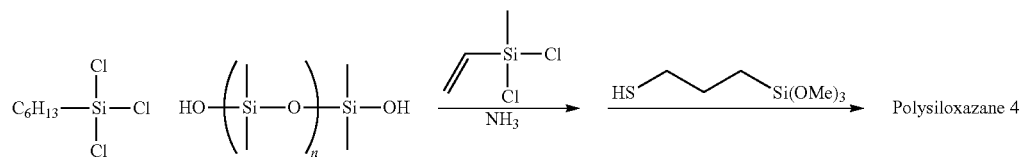

The inside of a four-neck glass flask equipped with a stirrer, a gas feed tube, a thermometer, and a reflux condenser was replaced with nitrogen. While passing nitrogen gas through the open end at the top of the reflux condenser to prevent outside air from entering, 21.9 g (0.100 mol) of hexyltrichlorosilane, 15.0 g of silicone oil modified with silanol at both ends having a kinematic viscosity at 25° C. of 30 mm²/s, and 75.6 g of CPME as a solvent were placed and stirred for 1 hour at room temperature. To this, 14.1 g (0.100 mol) of methylvinyldichlorosilane and 52.2 g of CPME were added and the mixture was stirred to obtain a uniform reaction liquid. The reaction liquid was cooled to 10° C. or less, and ammonia gas was fed into the solution through a feed tube. The ammonia feeding was continued for 3 hours while cooling the reaction liquid so that the temperature of the reaction liquid would not exceed 30° C. Then, the ammonia feeding was stopped, and nitrogen gas was flowed in through the feed tube for 2 hours to purge surplus ammonia gas. To this reaction liquid, 43.8 g of a 48% by weight aqueous sodium hydroxide was slowly added, 90.1 g of water was further added, and the mixture was stirred at room temperature for 1 hour. Then, the resulting product was allowed to stand to remove the lower layer. The upper layer was concentrated at 100° C./17 kPa, and then further concentrated at 120° C./4 kPa. Then, 34.7 g of toluene was added to 34.7 g of the obtained concentrate to obtain 69.4 g of a colorless transparent solution.

Subsequently, the inside of a four-neck glass flask equipped with a stirrer, a thermometer, a reflux condenser, and a dropping funnel was replaced with nitrogen, 8.4 g (0.042 mol) of mercaptopropyltrimethoxysilane and 8.4 g of toluene were placed, and heated to 90° C. A mixture of 40.0 g of the colorless transparent solution obtained above and 0.094 g (0.00049 mol) of 2,2'-azobis(2-methylbutyronitrile) were added from the dropping funnel over 2 hours, and the mixture was stirred for 2 hours while maintaining the same temperature to obtain Polysiloxazane 4.

To the obtained Polysiloxazane 4, 28.0 g of the isoparaffin solvent was added, and the mixture was concentrated at 120° C./16 kPa, and further concentrated at 120° C./4 kPa to obtain 46.3 g of a reaction product.

The non-volatile matter of the obtained reaction liquid was measured with an infrared moisture meter (FD-720, manufactured by Kett Electric Laboratory) under conditions of 105° C./3 hours, and found to be 51.9%. To this reaction liquid, 1.8 g of the isoparaffin solvent was added to adjust the non-volatile matter to 50%, thereby Composition 4 was obtained.

Figure 7:
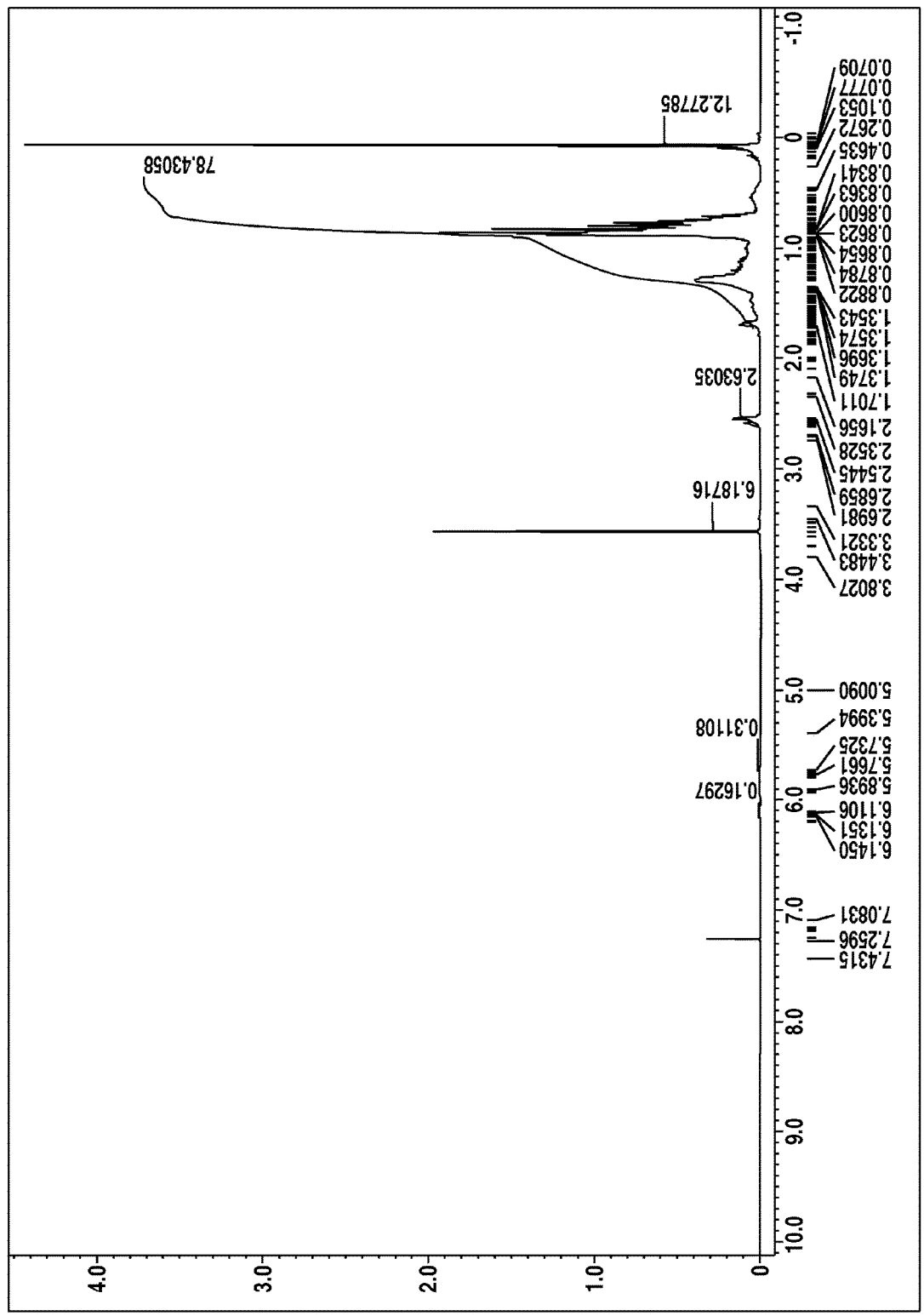
FIG. 7 is a $^1$H-NMR spectrum of the polysiloxazane compound obtained in Example 1-4.
Figure 8:
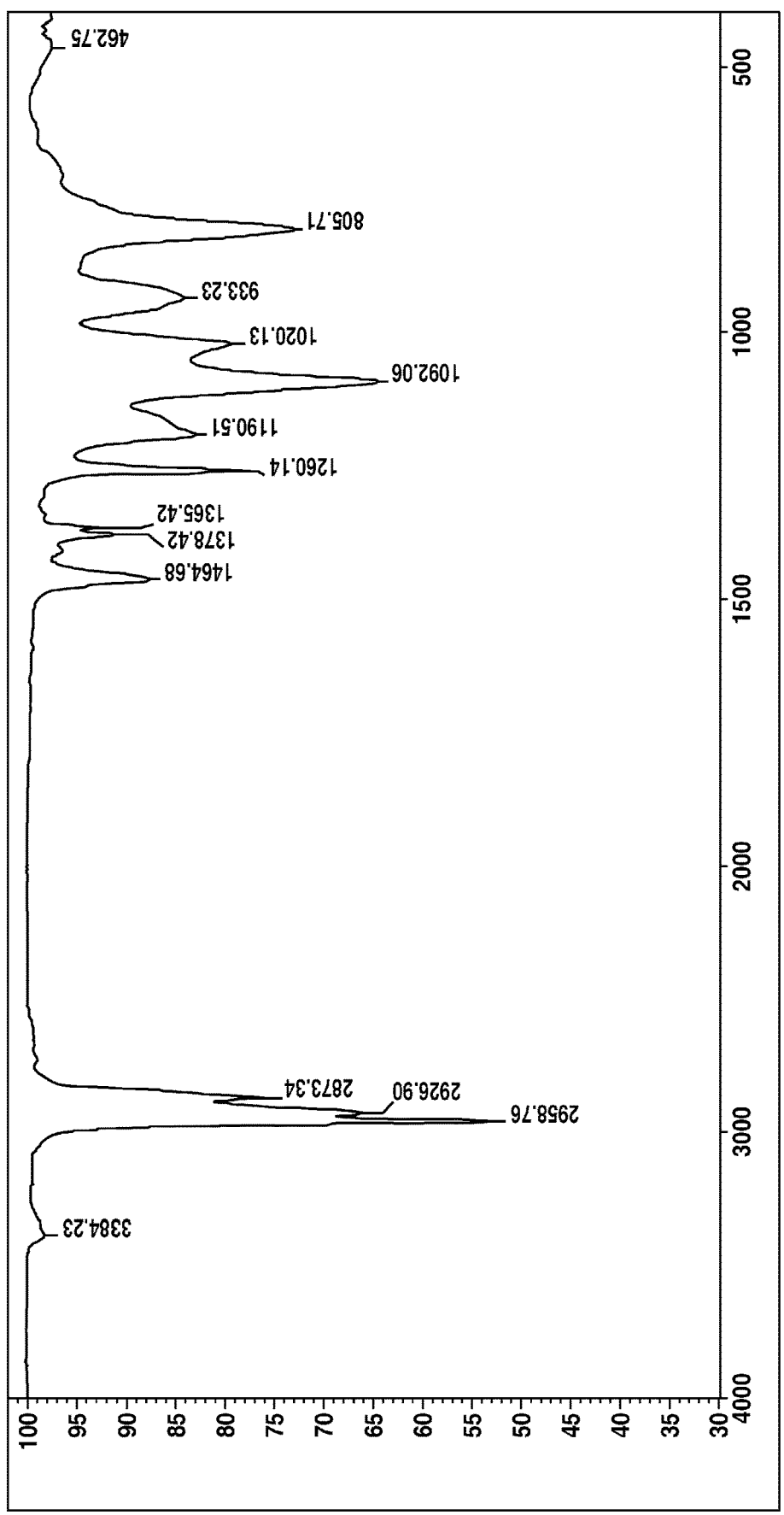
FIG. 8 is an IR spectrum of the polysiloxazane compound obtained in Example 1-4.

The obtained Composition 4 was subjected to IR analysis. Peaks at 933 cm$^{-1}$ and 1,190 cm$^{-1}$ derived from Si—N—Si structure, a peak at 1,092 cm$^{-1}$ derived from Si—O—Si, and a peak at 3,384 cm$^{-1}$ derived from NH were observed. GPC analysis was performed, and the weight average molecular weight was found to be 6,400, which supported the production of the target Polysiloxazane 4. The $^1$H-NMR spectrum is shown in FIG. 7, and the IR spectrum is shown in FIG. 8.

Example 1-5

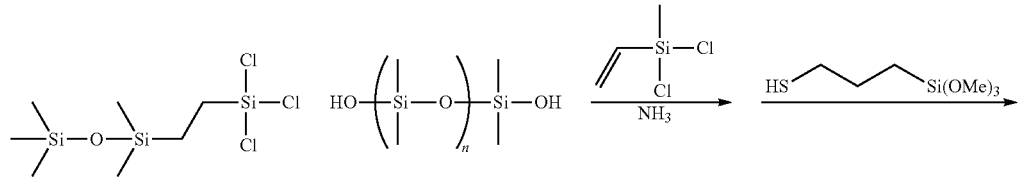

Polysiloxazane 5

The inside of a four-neck glass flask equipped with a stirrer, a gas feed tube, a thermometer, and a reflux condenser was replaced with nitrogen. While passing nitrogen gas through the open end at the top of the reflux condenser to prevent outside air from entering, 31.0 g (0.100 mol) of 1-trichlorosilyl-2-(trimethylsiloxydimethylsilyl)ethylene, 15.1 g of silicone oil modified with silanol at both ends having a kinematic viscosity at 25° C. of 60 mm²/s, and 74.9 g of CPME as a solvent were placed and stirred for 1 hour at room temperature. To this, 14.1 g (0.100 mol) of methylvinyldichlorosilane and 48.6 g of CPME were added and the mixture was stirred to obtain a uniform reaction liquid. The reaction liquid was cooled to 10° C. or less, and ammonia gas was fed into the reaction liquid through a feed tube. The ammonia feeding was continued for 3 hours while cooling the content so that the temperature of the content would not exceed 30° C. Then, the ammonia feeding was stopped, and nitrogen gas was flowed in through the feed tube for 2 hours to purge surplus ammonia gas. To this reaction liquid, 43.9 g of a 48% by weight aqueous sodium hydroxide was slowly added, 90.3 g of water was further added, and the mixture was stirred at room temperature for 1 hour. Then, the resulting product was allowed to stand to remove the lower layer. The upper layer was concentrated at 100° C./18 kPa, and then further concentrated at 120° C./4 kPa. Then, 45.4 g of toluene was added to 45.4 g of the obtained concentrate to obtain 86.1 g of a colorless transparent solution.

Subsequently, the inside of a four-neck glass flask equipped with a stirrer, a thermometer, a reflux condenser, and a dropping funnel was replaced with nitrogen, 6.8 g (0.035 mol) of mercaptopropyltrimethoxysilane and 6.8 g of toluene were placed, and heated to 90° C. A mixture of 40.0 g of the colorless transparent solution obtained above and 0.0667 g (0.000347 mol) of 2,2'-azobis(2-methylbutyronitrile) were added from the dropping funnel over 1.5 hours, and the mixture was stirred for 2 hours while maintaining the same temperature to obtain Polysiloxazane 5.

To the obtained Polysiloxazane 5, 26.1 g of the isoparaffin solvent was added, and the mixture was concentrated at 120° C./15 kPa, and further concentrated at 120° C./4 kPa. The non-volatile matter of the obtained reaction liquid was measured with an infrared moisture meter (FD-720, manufactured by Kett Electric Laboratory) under conditions of 105° C./3 hours, and found to be 70%. To this reaction liquid, 14.0 g of the isoparaffin solvent was added to adjust the non-volatile matter to 50%, thereby Composition 5 was obtained.

Figure 9:
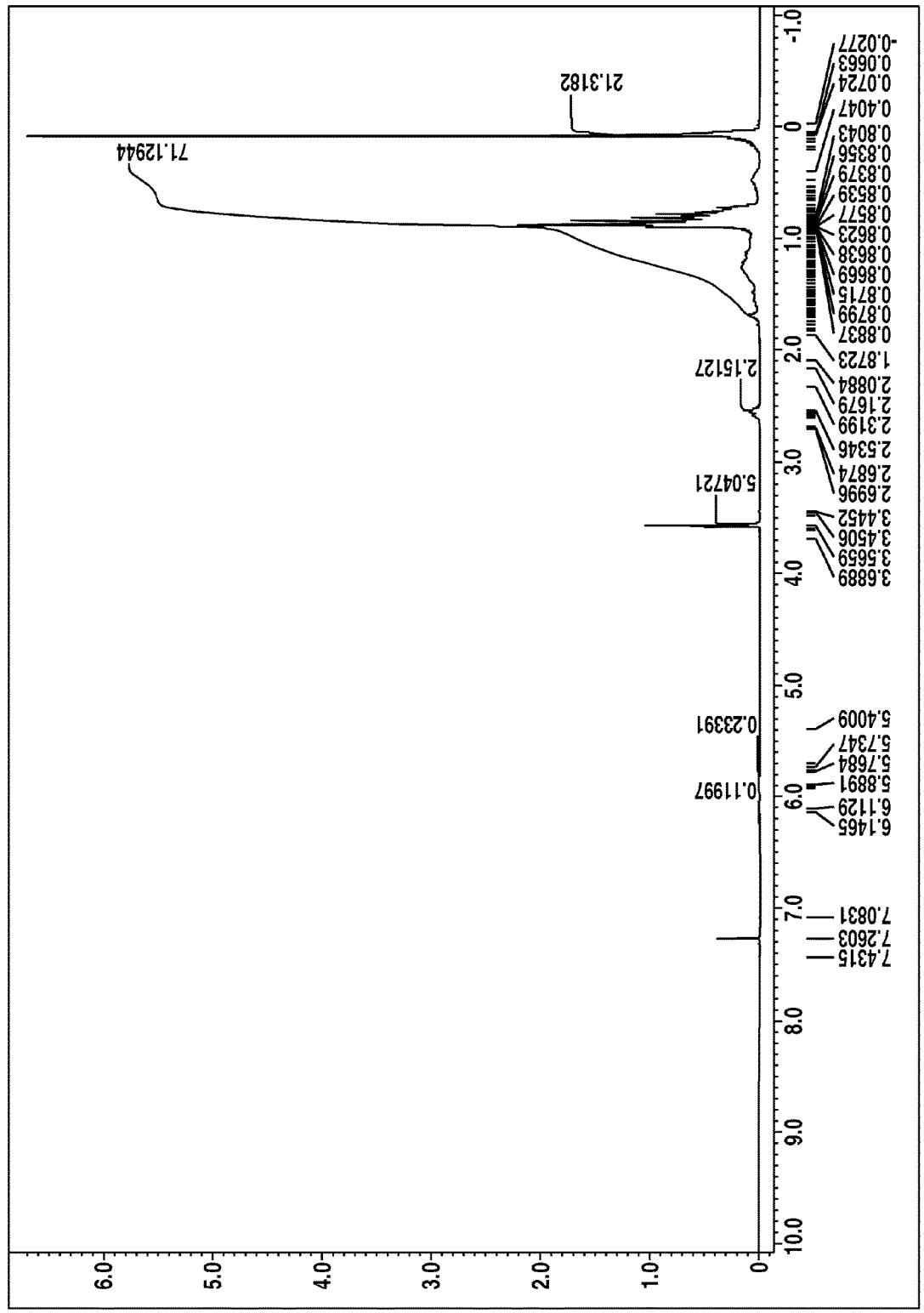
FIG. 9 is a $^1$H-NMR spectrum of the polysiloxazane compound obtained in Example 1-5.
Figure 10:
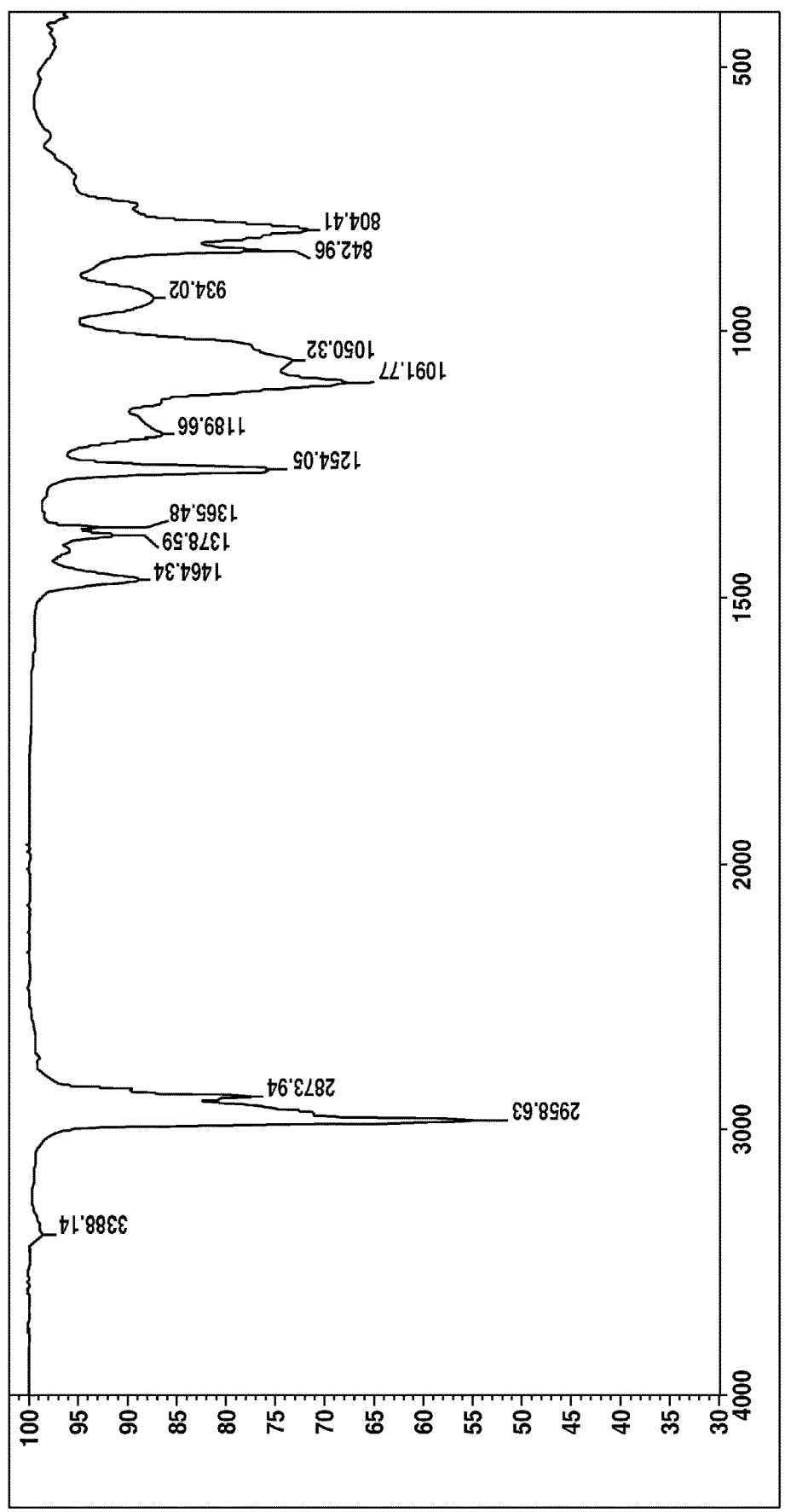
FIG. 10 is an IR spectrum of the polysiloxazane compound obtained in Example 1-5.

The obtained Composition 5 was subjected to IR analysis. Peaks at 934 cm$^{-1}$ and 1,189 cm$^{-1}$ derived from Si—N—Si structure, a peak at 1,091 cm⁻¹ derived from Si—O—Si, and a peak at 3,388 cm⁻¹ derived from NH were observed. GPC analysis was performed, and the weight average molecular weight was found to be 5,800, which supported the production of the target Polysiloxazane 5. The ¹H-NMR spectrum is shown in FIG. 9, and the IR spectrum is shown in FIG. 10.

Example 1-6

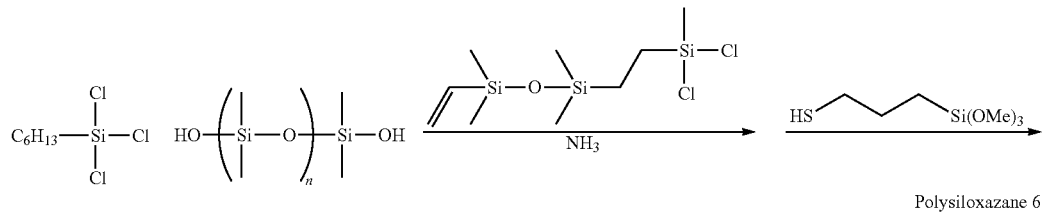

Polysiloxazane 6

The inside of a four-neck glass flask equipped with a stirrer, a gas feed tube, a thermometer, and a reflux condenser was replaced with nitrogen. While passing nitrogen gas through the open end at the top of the reflux condenser to prevent outside air from entering, 22.1 g (0.101 mol) of hexyltrichlorosilane, 15.0 g of silicone oil modified with silanol at both ends having a kinematic viscosity at 25° C. of 60 mm²/s, and 131.1 g of CPME as a solvent were placed and stirred for 1 hour at room temperature. To this, 30.1 g of 1-vinyl-3-dichloromethylethyl-1,1,3,3-tetramethyldisiloxane was added and the mixture was stirred to obtain a uniform reaction liquid. The reaction liquid was cooled to 10° C. or less, and ammonia gas was fed into the solution through a feed tube. The ammonia feeding was continued for 2 hours while cooling the reaction liquid so that the temperature of the reaction liquid would not exceed 30° C. Then, the ammonia feeding was stopped, and nitrogen gas was flowed in through the feed tube for 2 hours to purge surplus ammonia gas. To this reaction liquid, 43.8 g of a 48% by weight aqueous sodium hydroxide was slowly added, 90.2 g of water was further added, and the mixture was stirred at room temperature for 1 hour. Then, the resulting product was allowed to stand to remove the lower layer. The upper layer was concentrated at 100° C./18 kPa, and then further concentrated at 120° C./4 kPa. Then, 52.0 g of the isoparaffin solvent was added to 52.0 g of the obtained concentrate to obtain 104.0 g of a colorless transparent solution.

Subsequently, the inside of a four-neck glass flask equipped with a stirrer, a thermometer, a reflux condenser, and a dropping funnel was replaced with nitrogen, and 12.5 mg (0.00000192 mol as platinum) of a toluene solution of 20.0 g of the colorless transparent solution obtained above and a platinum divinyltetramethylsiloxane complex was added and heated to 60° C. To the obtained reaction liquid, 1.9 g (0.016 mol) of trimethoxysilane was added, and the mixture was stirred for 12 hours while maintaining the same temperature to obtain Polysiloxazane 6. The reaction liquid was concentrated at 120° C./4 kPa.

The non-volatile matter of the obtained reaction liquid was measured with an infrared moisture meter (FD-720, manufactured by Kett Electric Laboratory) under conditions of 105° C./3 hours, and found to be 55.9%. To this solution, 1.8 g of IP solvent 1620 was added to adjust the non-volatile matter to 50%, thereby Composition 6 was obtained.

Figure 11:
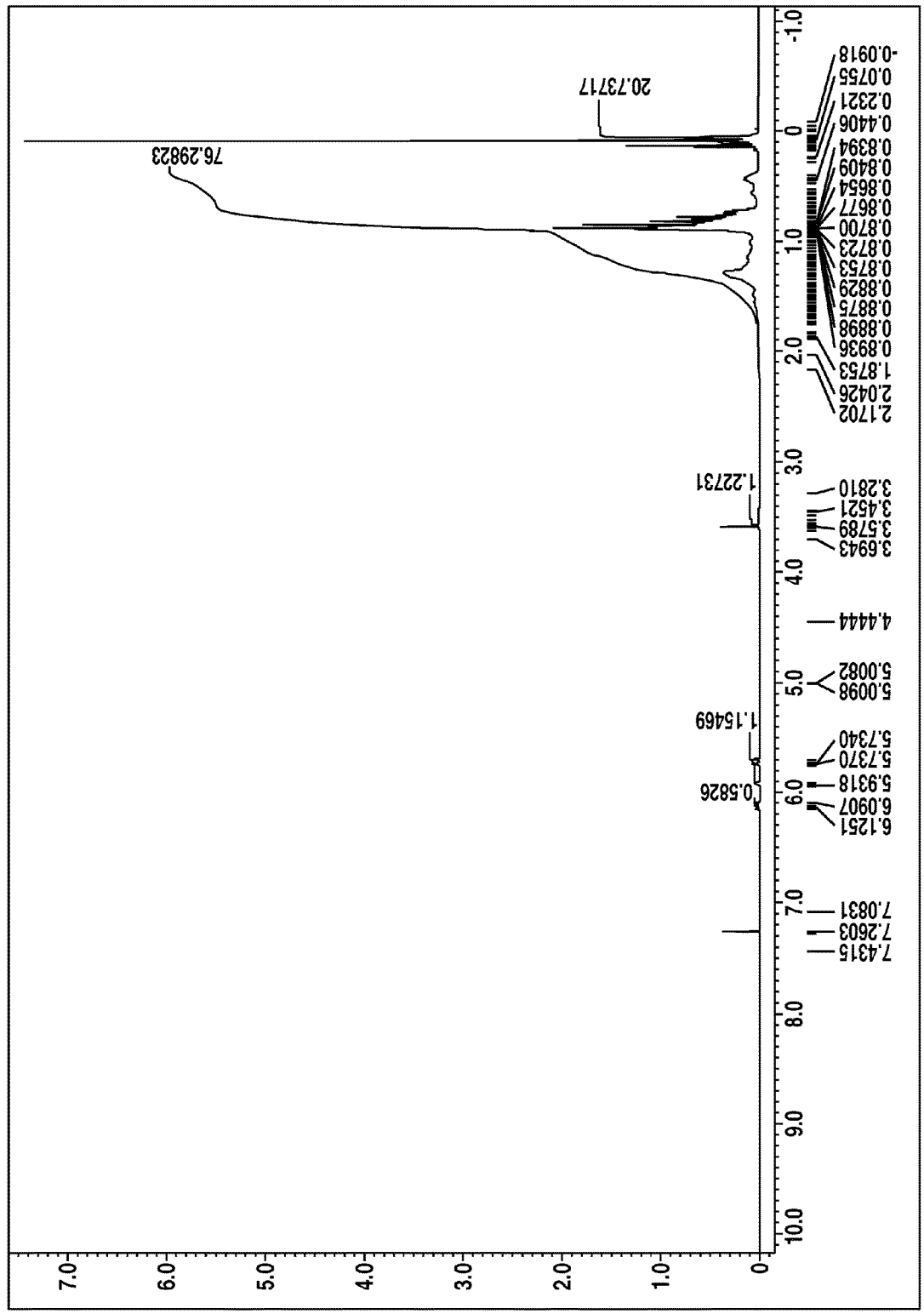
FIG. 11 is a $^1$H-NMR spectrum of the polysiloxazane compound obtained in Example 1-6.
Figure 12:
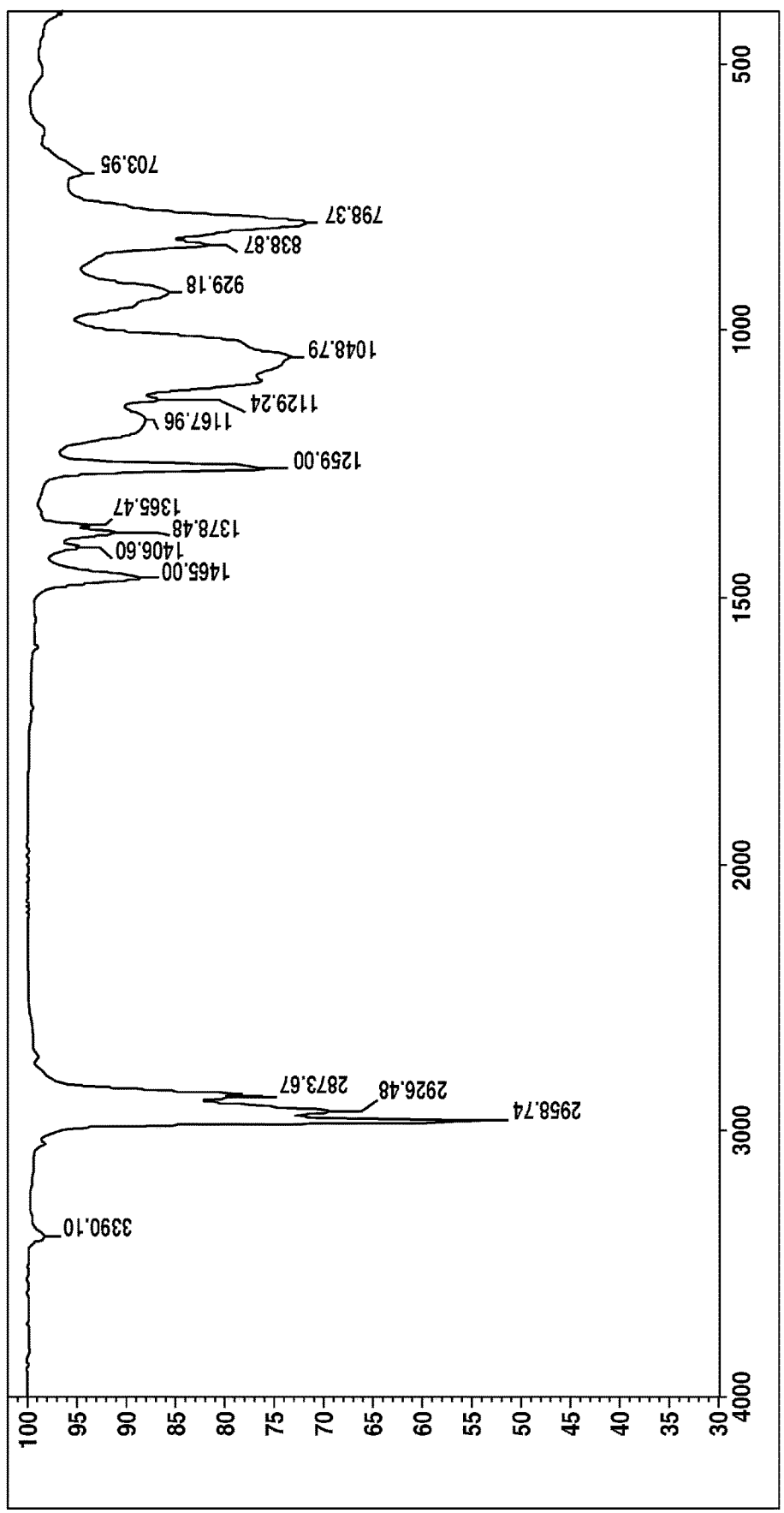
FIG. 12 is an IR spectrum of the polysiloxazane compound obtained in Example 1-6.

The obtained Composition 6 was subjected to IR analysis. Peaks at 929 cm and 1,167 cmi derived from Si—N—Si structure, a peak at 1,048 cm derived from Si—O—Si, and a peak at 3,390 cm⁻¹ derived from NH were observed. GPC analysis was performed, and the weight average molecular weight was found to be 4,600, which supported the production of the target Polysiloxazane 6. The ¹H-NMR spectrum is shown in FIG. 11, and the IR spectrum is shown in FIG. 12.

Comparative Example 1-1

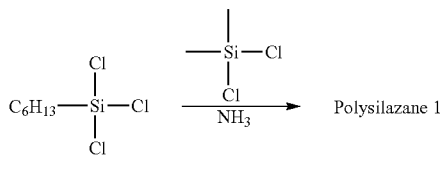

The inside of a four-neck glass flask equipped with a stirrer, a gas feed tube, a thermometer, and a reflux condenser was replaced with nitrogen. While passing nitrogen gas through the open end at the top of the reflux condenser to prevent outside air from entering, 148.3 g (0.675 mol) of hexyltrichlorosilane, 29.2 g (0.225 mol) of dimethyldichlorosilane, and 700 g of CPME as a solvent were placed to obtain a uniform solution. The solution was cooled to 10° C. or less, and ammonia gas was fed into the solution through a feed tube. The ammonia feeding was continued for 7 hours while cooling the reaction liquid so that the temperature of the reaction liquid would not exceed 30° C. Then, the ammonia feeding was stopped, and nitrogen gas was flowed in through the feed tube for 2 hours to purge surplus ammonia gas. The reaction liquid was filtered to remove ammonium chloride, thereby Polysilazane 1 was obtained.

To this reaction liquid, 105 g of the isoparaffin solvent was added to obtain 210.0 g of Composition 7 (concentration: 50%) as a colorless transparent solution.

The obtained Composition 7 was subjected to IR analysis. A peak at 922 cm⁻¹ derived from Si—N—Si structure and a peak at 3,370 cm⁻¹ derived from NH were observed. Under the following conditions, GPC analysis was performed, and the weight average molecular weight was found to be 2,700, which supported the production of the target Polysilazane 1.

Comparative Example 1-2

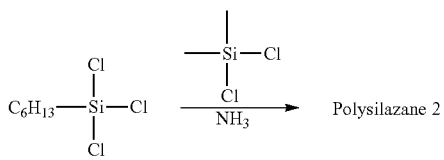

The inside of a four-neck glass flask equipped with a stirrer, a gas feed tube, a thermometer, and a reflux condenser was replaced with nitrogen. While passing nitrogen gas through the open end at the top of the reflux condenser to prevent outside air from entering, 55.0 g (0.250 mol) of hexyltrichlorosilane, 97.4 g (0.753 mol) of dimethyldichlorosilane, and 520 g of CPME as a solvent were placed to obtain a uniform solution. The solution was cooled to 10° C. or less, and ammonia gas was fed into the solution through a feed tube. The ammonia feeding was continued for 7 hours while cooling the reaction liquid so that the temperature of the reaction liquid would not exceed 30° C. Then, the ammonia feeding was stopped, and nitrogen gas was flowed in through the feed tube for 2 hours to purge surplus ammonia gas. The reaction liquid was filtered to remove ammonium chloride, thereby Polysilazane 2 was obtained.

To this reaction liquid, 88.0 g of the isoparaffin solvent was added to obtain 176.0 g of Composition 8 (concentration: 50%) as a colorless transparent solution.

The obtained Composition 8 was subjected to IR analysis. A peak at 922 cm$^{-1}$ derived from Si—N—Si structure and a peak at 3,370 cm$^{-1}$ derived from NH were observed. Under the following conditions, GPC analysis was performed, and the weight average molecular weight was found to be 780, which supported the production of the target Polysilazane 2.

Examples 2-1 to 2-6 and Comparative Examples 2-1 and 2-2

Each composition obtained in Examples 1-1 to 1-6 and Comparative Examples 1-1 and 1-2 was mixed at the ratio shown in Table 1 below with being careful to prevent moisture from entering to prepare a composition for forming a coating.

A black aminoalkyd resin coated plate conforming to JIS K 2398 was washed with an abrasive (Bakuhaku ONE, manufactured by KeePer Giken), and dried at room temperature. The prepared composition for forming a coating was spread on this coated plate with a sponge. The plate was allowed to stand for 5 minutes, and then the composition was wiped up with a microfiber cloth until unevenness disappeared. Then, the plate was allowed to stand overnight at room temperature to obtain a test piece.

The water contact angle of 5 μL and the water sliding angle of 50 μL of this test piece were measured using a contact angle meter (manufactured by Kyowa Interface Science Co., LTD.) and evaluated based on the following criteria. The results are shown in Table 1.
Evaluation Criteria
[Water Contact Angle]
⊚: 100 degrees or more
○: 95 degrees or more and less than 100 degrees
Δ: 90 degrees or more and less than 95 degrees
x: less than 90 degrees
[Water Sliding Angle]
⊚: Water droplet slides down at less than 10 degrees
○: Water droplet slides down at 10 degrees or more and less than 20 degrees
Δ: Water droplet slides down at 20 degrees or more and less than 29 degrees
X: Water droplet slides down at 30 degrees or more.

TABLE 1

| Component (parts by weight) | | Example 2-1 | 2-2 | 2-3 | 2-4 | 2-5 | 2-6 | Comparative Example 2-1 | 2-2 |
|---|---|---|---|---|---|---|---|---|---|
| Principal component | Composition 1 | 40.0 | | | | | | | |
| | Composition 2 | | 66.6 | | | | | | |
| | Composition 3 | | | 66.6 | | | | | |
| | Composition 4 | | | | 40.0 | | | | |
| | Composition 5 | | | | | 40.0 | | | |
| | Composition 6 | | | | | | 40.0 | | |
| | Composition 7 | | | | | | | 40.0 | |
| | Composition 8 | | | | | | | | 40.0 |
| Solvent | IP solvent 1620 | 60.0 | 33.4 | 33.4 | 60.0 | 60.0 | 60.0 | 60.0 | 60.0 |
| Curing catalyst | Tetrabutoxy titan | 1.00 | 1.00 | 1.00 | 1.00 | 1.00 | 1.00 | 1.00 | 1.00 |
| Evaluation | Water contact angle | ○ | ⊚ | ⊚ | ○ | ○ | ○ | ○ | Δ |
| | Water sliding angle | ⊚ | ○ | ○ | ⊚ | ○ | ○ | Δ | X |

As shown in Table 1, all of the coatings obtained from the composition for forming a coating having a polysiloxazane compound as a principal component obtained in Examples has a water contact angle of 95 degrees or more and a water sliding angle of less than 20 degrees, and was proved to have excellent water-repellent property and water droplet-sliding property.

In particular, for the compositions for forming a coating of Examples 2-1 and 24, the water droplet slid down at less than 10 degrees, and the compositions for forming a coating were proved to have extremely high water droplet-sliding property. Meanwhile, in Comparative Example 2-1, though the water-repellent property was in a level comparable to that in Examples, the sliding property was obviously inferior. In Comparative Example 2-2, both the water-repellent property and the water droplet-sliding property were inferior to Examples.

Japanese Patent Application No. 2019-177517 is incorporated herein by reference.

Although some preferred embodiments have been described, many modifications and variations may be made thereto in light of the above teachings. It is therefore to be understood that the invention may be practiced otherwise

The invention claimed is:

1. A polysiloxazane compound having an alkoxysilyl group, having an average composition of formula (1) below:

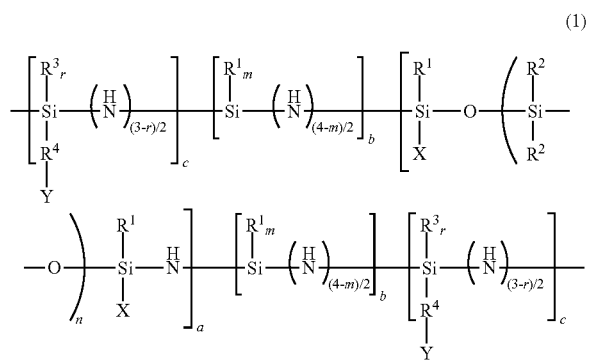

wherein $R^1$ each independently represents a substituted or unsubstituted monovalent hydrocarbon group having 1 to 50 carbon atoms that optionally contains O or S, $R^2$ each independently represents a substituted or unsubstituted monovalent hydrocarbon group having 1 to 10 carbon atoms, $R^3$ each independently represents an unsubstituted monovalent hydrocarbon group having 1 to 10 carbon atoms, $R^4$ each independently represents a substituted or unsubstituted divalent hydrocarbon group having 2 to 20 carbon atoms that optionally contains O, S, or Si, X each independently represents a methyl group, $NH-SiR^1X$, $(NH)_{(4-m/2)}-SiR^1_m$, or $(NH)_{(3-t/2)}-SiR^3_rR^4-Y$ (wherein $R^1$, $R^3$, and $R^4$ represent a meaning same as above), Y represents a group of formula (2) or (3) below:

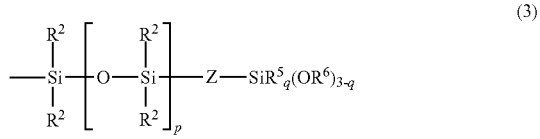

(wherein $R^2$ represents a meaning same as above, $R^5$ and $R^6$ each independently represent a substituted or unsubstituted monovalent hydrocarbon group having 1 to 10 carbon atoms, Z represents a substituted or unsubstituted divalent hydrocarbon group having 1 to 18 carbon atoms, or an oxygen atom, p is an integer of 0 to 9, and q is 0, 1, or n is each independently an integer of 11 to 500, m is each independently 0, 1, or each independently 0 or 1, and a, b, and c are numbers that satisfy $0<a<1$, $0\le b<1$, $0<c<1$, and $a+2b+2c=1$, and if X is $NH-SiR^1X$, $0\le s\le 2a$ (wherein s is a total number of X).

2. A process for producing the polysiloxazane compound having an alkoxysilyl group according to claim 1, comprising the steps of:

performing dehydrochlorination condensation between a silicone oil modified with OH at both ends of formula (4) below:

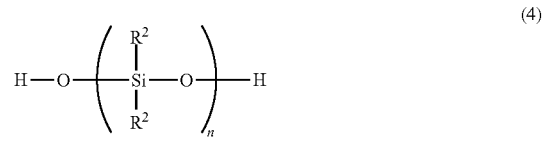

wherein $R^2$ and n represent a meaning same as above and a chlorosilane compound of formula (5) below:

wherein $R^1$ and m represent a meaning same as above to obtain a chlorosiloxane compound of formula (6) below:

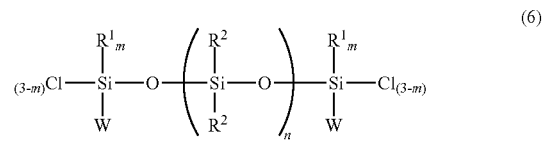

wherein W each independently represents a methyl group or a chlorine atom, and $R^1$ and m represent a meaning same as above, performing ammonolysis polymerization by further adding a chlorosilane compound of formula (7) below:

wherein $R^{4'}$ represents a single bond, or a substituted or unsubstituted divalent hydrocarbon group having 1 to 10 carbon atoms that optionally contains O, S, or Si, and $R^3$ and r represent a meaning same as above to the chlorosiloxane compound of formula (6) and a surplus of the chlorosilane compound of formula (5) to obtain an unsaturated bond-containing polysiloxazane compound of formula (8) below:

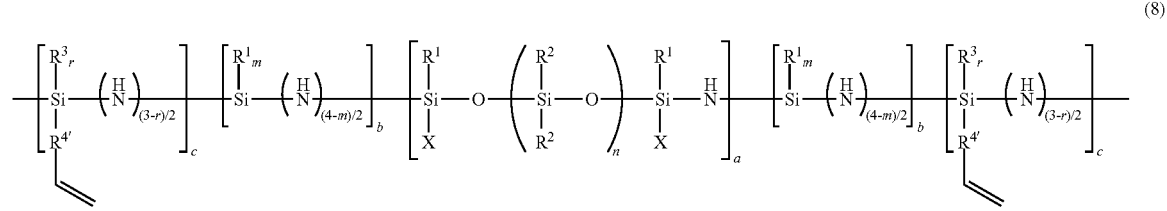

wherein $R^1$ to $R^3$, $R^{4'}$, a, b, c, n, m, r, and X represent a meaning same as above, and performing addition reaction between the unsaturated bond-containing polysiloxazane compound of formula (8) and a mercapto group-containing silane compound of formula (9) below:

$$HS-R^7-SiR^5{}_q(OR^6)_{3-q} \qquad (9)$$

wherein $R^7$ represents a divalent hydrocarbon group having 1 to 8 carbon atoms, and $R^6$, $R^7$, and q represent a meaning same as above in presence of a radical generator.

3. A process for producing the polysiloxazane compound having an alkoxysilyl group according to claim 1, comprising the step of:

performing addition reaction between an unsaturated bond-containing polysiloxane compound of formula (12) below:

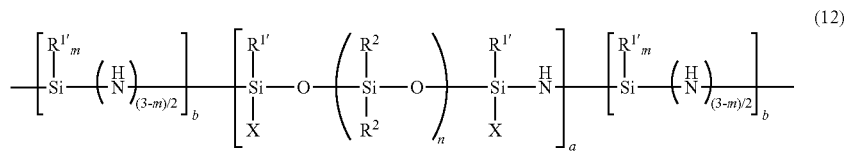

(12)

wherein $R^{1'}$ represents a meaning same as that of $R^1$ or $R^3$ above except that $R^{1'}$ necessarily contains an unsaturated bond, and $R^1$, $R^2$, a, b, n, m, and X represent a meaning same as above and a mercapto group-containing silane compound of formula (9) below:

$$HS-R^7-SiR^5{}_q(OR^6)_{3-q} \qquad (9)$$

wherein $R^7$ is a divalent hydrocarbon group having 1 to 8 carbon atoms, and R', $R^6$, and q represent a meaning same as above in presence of a radical generator.

4. A process for producing the polysiloxazane compound having an alkoxysilyl group according to claim 1, comprising the steps of:

performing dehydrochlorination condensation between a silicone oil modified with OH at both ends of formula (4) below:

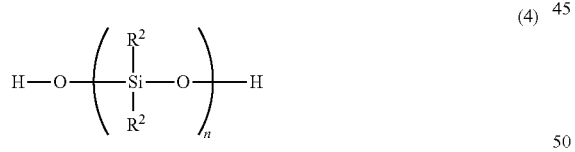

(4)

wherein $R^2$ and n represent a meaning same as above and a chlorosilane compound of formula (5) below:

$$R^1{}_m-SiCl_{(4-m)} \qquad (5)$$

wherein $R^1$ and m represent a meaning same as above to obtain a chlorosiloxane compound of formula (6) below:

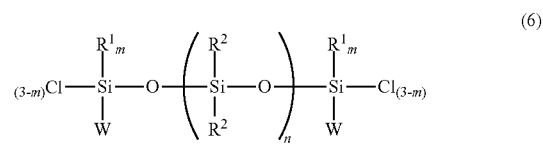

(6)

wherein W represents a methyl group or a chlorine atom, and $R^1$ and m represent a meaning same as above, performing ammonolysis polymerization by further adding a chlorosilane compound of formula (7) below:

(7)

wherein $R^{4'}$ represents a single bond, or a substituted or unsubstituted divalent hydrocarbon group having 1 to 10 carbon atoms that optionally contains O, S, or Si, and $R^3$ and r represent a meaning same as above to the chlorosiloxane compound of formula (6) to obtain an unsaturated bond-containing polysiloxazane compound of formula (8) below:

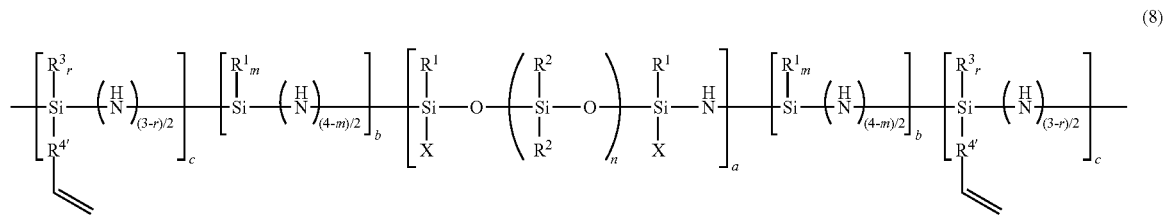

(8)

wherein R¹ to R³, R⁴', a, b, c, n, m, r, and X represent a meaning same as above, and performing addition reaction between the unsaturated bond-containing polysiloxazane compound of formula (8) and a hydrogen silane compound of formula (13) or (14) below:

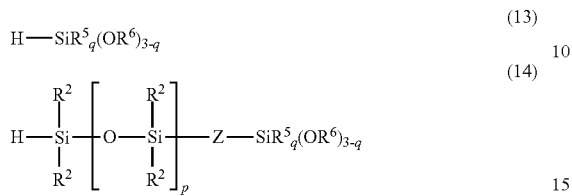

(13)

(14)

wherein R², R⁵, R⁶, p, q, and Z represent a meaning same as above in presence of a platinum catalyst.

5. A process for producing the polysiloxazane compound having an alkoxysilyl group according to claim 1, comprising the step of:

performing addition reaction between an unsaturated bond-containing polysiloxazane compound of formula (12) below:

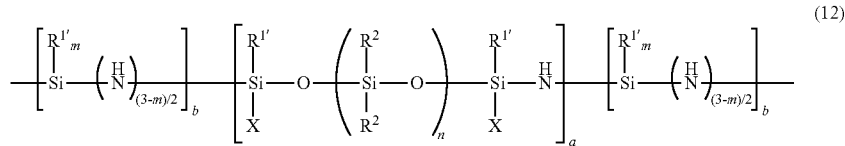

(12)

wherein $R^{1'}$ represents a meaning same as that of $R^1$ or $R^3$ above except that $R^{1'}$ necessarily contains an unsaturated bond, and $R^1$, $R^2$, a, b, n, m, and X represent a meaning same as above and a hydrogen silane compound of formula (13) or (14) below:

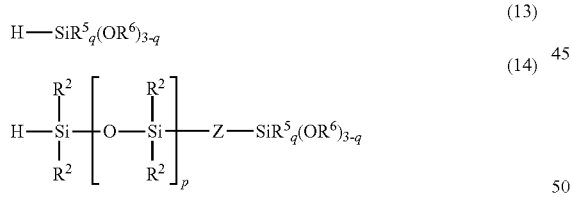

(13)

(14)

wherein R², R⁵, R⁶, p, q, and Z represent a meaning same as above in presence of a platinum catalyst.

6. A composition comprising:
the polysiloxazane compound having an alkoxysilyl group according to claim 1; and a solvent.

7. The composition according to claim 6, further comprising:
at least one metal compound selected from a titanium compound, an aluminum compound, a zinc compound, and a tin compound.

8. A cured product obtained by curing the composition according to claim 6.

9. A cured product obtained by curing the composition according to claim 7.

* * * * *